(12) United States Patent
Becker et al.

(10) Patent No.: US 8,399,571 B2
(45) Date of Patent: Mar. 19, 2013

(54) SILANE-MODIFIED POLYOLEFINS HAVING A HIGH DEGREE OF FUNCTIONALIZATION

(75) Inventors: Hinnerk Gordon Becker, Essen (DE); Hans Guenther Wey, Muelheim (DE)

(73) Assignee: Evonik Degussa GmbH, Essen (DE)

( * ) Notice: Subject to any disclaimer, the term of this patent is extended or adjusted under 35 U.S.C. 154(b) by 166 days.

(21) Appl. No.: 12/990,955

(22) PCT Filed: Jul. 2, 2009

(86) PCT No.: PCT/EP2009/058327
§ 371 (c)(1),
(2), (4) Date: Nov. 4, 2010

(87) PCT Pub. No.: WO2010/018027
PCT Pub. Date: Feb. 18, 2010

(65) Prior Publication Data
US 2011/0060078 A1 Mar. 10, 2011

(30) Foreign Application Priority Data
Aug. 15, 2008 (DE) .......................... 10 2008 041 279

(51) Int. Cl.
*C08C 19/25* (2006.01)
*C08F 8/00* (2006.01)

(52) U.S. Cl. ........ 525/342; 525/244; 525/263; 525/288; 525/331.7; 525/333.7

(58) Field of Classification Search .................. 525/244, 525/263, 288, 331.7, 333.7, 342
See application file for complete search history.

(56) References Cited

U.S. PATENT DOCUMENTS

| 5,994,474 | A | 11/1999 | Wey et al. | |
|---|---|---|---|---|
| 6,156,856 | A * | 12/2000 | Saito et al. | 526/90 |
| 6,235,848 | B1 | 5/2001 | Bickert et al. | |
| 6,281,288 | B1 | 8/2001 | Bickert et al. | |
| 7,807,768 | B2 | 10/2010 | Becker et al. | |
| 8,025,758 | B2 | 9/2011 | Loehden et al. | |
| 2005/0043455 | A1 | 2/2005 | Hohner | |
| 2008/0069949 | A1 | 3/2008 | Glockner et al. | |
| 2008/0167421 | A1 | 7/2008 | Yalvac et al. | |
| 2008/0194765 | A1 * | 8/2008 | Becker et al. | 525/240 |
| 2008/0213515 | A1 | 9/2008 | Vey et al. | |
| 2008/0214757 | A1 | 9/2008 | Becker et al. | |
| 2009/0143531 | A1 | 6/2009 | Ouhadi et al. | |
| 2010/0279033 | A1 | 11/2010 | Becker et al. | |
| 2010/0285246 | A1 | 11/2010 | Becker et al. | |

FOREIGN PATENT DOCUMENTS

| EP | 1 508 579 | | 2/2005 |
|---|---|---|---|
| EP | 1 900 773 | | 3/2008 |
| WO | 89 11513 | | 11/1989 |
| WO | 2006/108744 | * | 10/2006 |
| WO | 2007 008765 | | 1/2007 |
| WO | 2007/008765 | * | 1/2007 |

OTHER PUBLICATIONS

U.S. Appl. No. 12/992,792, filed Nov. 15, 2010, Becker, et al.
International Search Report issued Aug. 25, 2009 in PCT/EP09/058327 filed Jul. 2, 2009.
U.S. Appl. No. 12/830,628, filed Jul. 6, 2010, Becker, et al.
U.S. Appl. No. 12/830,869, filed Jul. 6, 2010, Becker, et al.
U.S. Appl. No. 12/830,889, filed Jul. 6, 2010, Becker, et al.
U.S. Appl. No. 13/201,522, filed Aug. 15, 2011, Kohlstruk, et al.
U.S. Appl. No. 13/144,968, filed Jul. 18, 2011, Kohlstruk, et al.

* cited by examiner

*Primary Examiner* — Robert C Boyle
(74) *Attorney, Agent, or Firm* — Oblon, Spivak, McClelland, Maier & Neustadt, L.L.P.

(57) ABSTRACT

The present invention relates to modified polyolefins having a propylene content of at least 50 ma-% and a maximum of 75 ma-%, being determined by means of $^{13}$C-NMR spectroscopy, and having a poly(ethylene) triad content of a maximum of 2.5 ma-%, being determined by means of $^{13}$C-NMR spectroscopy, relative to the total detected ethylene content, a melting heat of at least 9 and a maximum of 20 J/g, determined by means of differential calorimetry, and a solubility in xylol at ambient temperature of at least 96 ma-%, and a solubility in THF at ambient temperature of at least 67 ma-%, wherein one or multiple silanes are grafted onto the polymer. The invention further relates to a method for the production of the polyolefins, and to the use thereof, particularly in or as an adhesive.

28 Claims, 2 Drawing Sheets

Figures: Investigations on bonds

SILANE-MODIFIED POLYOLEFINS HAVING A HIGH DEGREE OF FUNCTIONALIZATION

Figure 1:
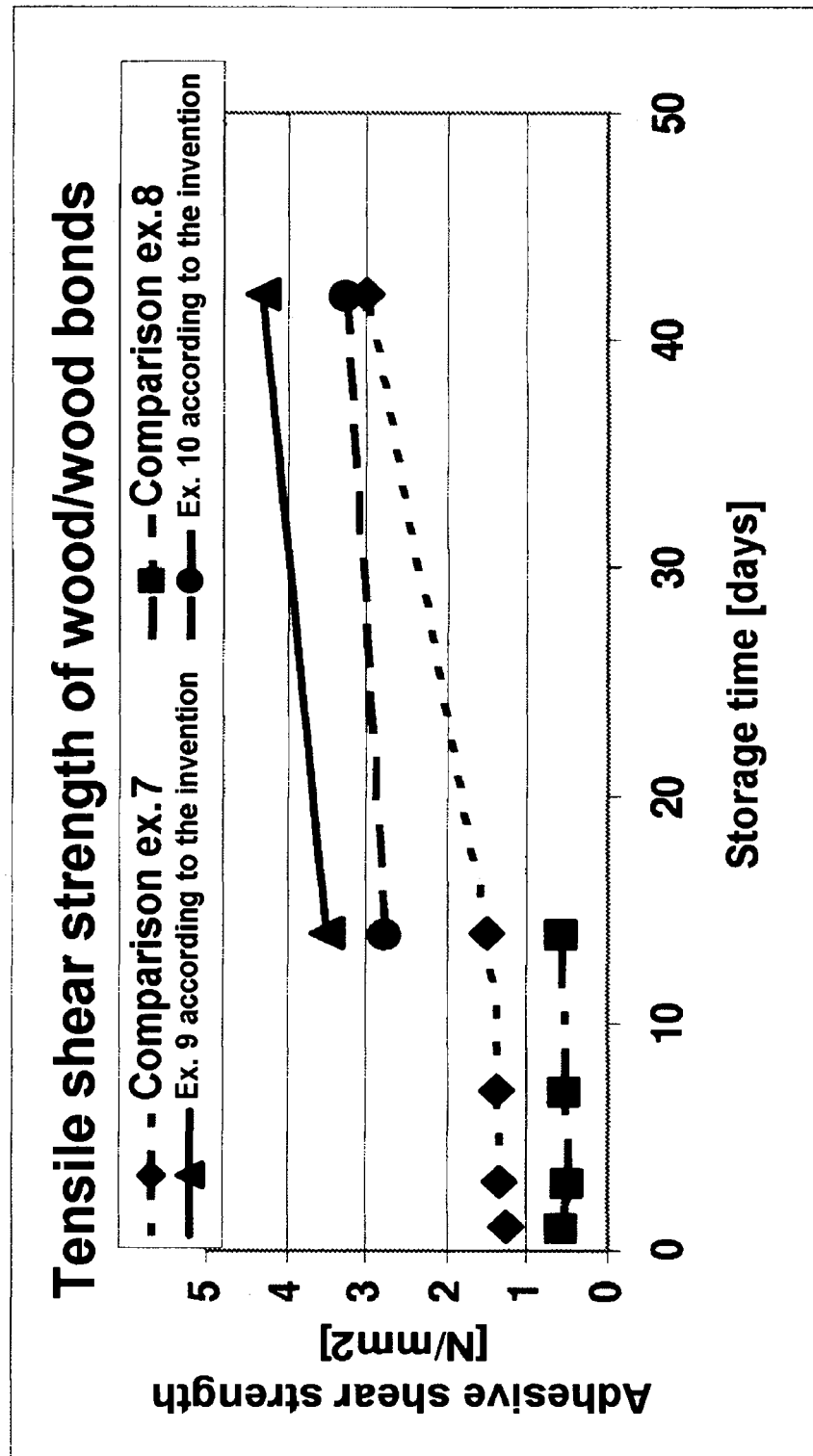

The present invention relates to modified polyolefins having a high degree of functionalization based on partly crystalline polyolefin polymers which have a certain content of poly(propylene) and a certain content of poly(ethylene) chain elements, one or more silanes being grafted on to the polymer, a process for the preparation of the polyolefins and the use thereof, in particular in or as an adhesive.

Amorphous poly-alpha-olefins often serve as adhesive raw materials for a wide range of uses. The field of use extends from the hygiene sector via laminations and packaging adhesives to construction gluing and uses in processing of wood. Non-modified amorphous poly-alpha-olefins (so-called APAOs) are distinguished in this context by a purely physical curing, which is reversible as desired due to their thermoplastic character. However, they have only limited tensile and adhesive shear strengths and a relatively low heat resistance. Furthermore, no covalent binding in of reactive surface groups (such as e.g. —OH) into a bond can be achieved with them.

The disadvantages described for non-modified APAOs can be eliminated by subsequent functionalization (modification), carboxylic acids and carboxylic acid derivatives and/or silanes being employed above all for the modification.

The preparation of silane-modified polyolefins by reaction of polyethylene with unsaturated silanes has been known for a long time. A method for crosslinking poly($\alpha$-olefins) with the aid of silane compounds, with which degrees of crosslinking which are as high as possible are said to be achieved, is already described in EP 0 004 034. The crosslinking is carried out directly after the grafting and leads to rigid, high-strength materials with a low brittle temperature, such as are used e.g. for the production of cable sheathings and/or shaped articles. The polymers described cannot be employed as adhesives.

U.S. Pat. No. 4,412,042 describes a process for the preparation of polyolefins crosslinked by silane linkages, the crosslinked products of which have a high mechanical strength, an improved deformability and a reduced permanent percentage elongation. Low density ethylene copolymers which have been prepared by means of gas phase polymerization are employed as polyolefins. The polymers according to the invention are used as covering materials for the production of wires or cables and for the production of shaped articles, pipes, sheets or films. The polymers described cannot be employed as adhesives.

DE 1 963 571, DE 2 353 783 and DE 2 406 844 describe processes for the crosslinking of polyethylene polymers or ethylene copolymers which contain small amounts of propene and/or 1-butene. Target products are crosslinked shaped articles based on polyethylene.

DE 2 554 525 and DE 2 642 927 describe processes for the production of extruded products incl. silane functionalization of a polymer, incorporation of a silanol condensation catalyst and shaping and crosslinking of the polymer in one working step by using an extruder. Cables, pipes and hoses are mentioned as end uses. No bonds are possible with the polymers prepared in this manner, and the entire further processing is also possible to only a very limited extent because of the crosslinking carried out directly after the modification.

The possibility of improving adhesion to functional surfaces, such as e.g. glass, by introduction of silane groups into polyolefins has likewise been known for a long time. Thus, U.S. Pat. No. 3,075,948 already describes graft polymers comprising unsaturated silane monomers and solid poly(alpha-olefins) having 2-6 carbon atoms, which are said to have an improved heat resistance and a good adhesion to glass. The modification described is either a pure surface modification of solid polymer particles, polymer sheets or polymer moldings, particularly preferably a solution modification in which the polymer is at least partly superficially dissolved, or a melt modification, which, however, is not preferred. The modified polymers obtained are employed for the production of moldings and containers and as a coating for glass containers, and they are not suitable for use as hot melt adhesives because of the completely different profile of requirements (melt viscosity, material rigidity in the non-crosslinked state etc.).

The use of amorphous poly(alpha-olefins) for silane crosslinking is also already known. Thus, for example, EP 0 260 103 describes amorphous silane-modified polymers with a saturated carbon skeleton and low molecular weight which are employed as coating compositions for protection from weathering influences. Examples of such polymers which are mentioned are copolymers of ethylene and/or $\alpha$-olefins, in particular EPM and EPDM. The base polymers described are amorphous and rubber-like and have a high elasticity. Because of their rubber-like character, processability in the non-crosslinked state is poor. The products are not suitable for the uses in the adhesives and sealants sector intended in the present application.

DE 4 000 695 describes the use of largely amorphous poly(alpha-olefins) in a process in which the APAOs are reacted with a donor of free radicals and optionally additionally graftable monomers (e.g. vinylsilanes), with simultaneous exposure to shearing forces. The products obtained are suitable for use as carpet coating compositions or as hot melt adhesives. The polymers indeed have a softening point in the lower to middle temperature range of 70-140° C., but have only a low functionalization, since the ratio of grafting polymerization to chain cleavage is unfavorable. Because of the low functionalization, the crosslinking reaction proceeds slowly and binding to reactive surfaces is only relatively weak. Furthermore, the tensile strength both of the non-crosslinked and of the crosslinked modified polyolefin reaches only relatively low values, as a result of which the products remain excluded from many fields of use.

In JP 2003-002930 A graft polymers are prepared from amorphous poly($\alpha$-olefin)s, unsaturated carboxylic acids and optionally additionally unsaturated aromatic substances (e.g. styrene). The polyolefins used are amorphous and have no crystallinity>1 J/g in DSC measurements. Moisture-crosslinking monomer systems, such as e.g. vinyl-silanes, are not discussed, the grafted polyolefins do not have the desired material parameters because of the properties of their base polymer and the grafting monomers used, and in particular they are too soft and show too low a tensile strength.

WO 03/070786 describes a process for the preparation of modified poly(1-butene) polymers, the modified poly(1-butene) polymers obtainable therefrom and an adhesive composition containing the modified poly(1-butene) polymers. In this context the poly(1-butene) base polymer used for the modification has a melting point in the range of from 0 to 100° C., an isotacticity index of <20% and a polydispersity of <4.0. Unsaturated carboxylic acids, carboxylic acid anhydrides and corresponding derivatives, such as amides, esters etc., are mentioned as grafting monomers. Vinylsilanes are not described. The modified polymers prepared are relatively soft and have rather a wax-like nature due to their low crystallinity, and the low polydispersity leads to difficulties during processing. The low melting point has the effect of a poor heat resistance of the adhesive bonds. The polymers are not suitable for the uses intended in the present application.

WO 2006/069205 describes modified polyolefins based on low-viscosity polypropylene polymers having a propylene content of >50 wt. % and a high content of isotactic propylene sequences, which can also be prepared inter alia via a free radical grafting polymerization. Because of the material properties of the base polymers used, the products obtained are not suitable for the fields of use intended in the present application.

WO 2007/067243 describes polypropylene polymers which are functionalized by carboxylic acids and have a high to very high propylene content. Moisture-crosslinking systems, e.g. based on silanes, are not described. Because of the base polymers used and the grafting monomers used, the products described are not suitable for the fields of use intended in the present application.

WO 91/06580 describes silane-modified unsaturated amorphous polymers which can be employed e.g. as shaped articles in the crosslinked state. Adhesive compositions, including those of hot melt adhesives, are mentioned as further examples of use for the silane-modified polymers. Examples of unsaturated base polymers which are mentioned are rubber-like polymers, such as e.g. styrene/butadiene block copolymers (SBS), styrene/isoprene block copolymers (SIS), styrene/butadiene rubber (SBR), nitrile rubber, polychloroprene rubber and butyl rubber. All the base polymers mentioned have a rubber elasticity (i.e. also a poor processability) or other negative material properties (such as e.g. poor heat resistances) which render them unsuitable for hot melt adhesive uses.

The use of silane-modified polymers in hot melt adhesives is likewise known. Thus, for example, WO 89/11513 describes an adhesive composition which comprises at least one silane-modified or silane-grafted partly crystalline polymer. In this context, homo-, co- and terpolymers of $C_{2-6}$ α-olefins and isotactic polypropylene polymers and blends of polypropylenes, in particular if they also contain atactic polypropylene, are mentioned in particular as base polymers. In the grafting of isotactic polypropylene (iPP), an extremely rapid and complete degradation of the polymer occurs because of the molecular structure of the iPP, it being possible to achieve only very low rates of functionalization, and the grafted products moreover have a highly wax-like character. Atactic polypropylene, on the other hand, has in itself a very low softening point [see e.g.: H.-G. Elias; Makromoleküle; vol. III; Wiley-VCH: Weinheim; 2001]. The procedure described in WO 89/11513 leads to an addition of these disadvantages and to a very poor product performance with respect to the material properties. The cause of the viscosity, melting properties and "tack" of the adhesive composition is attributed to the use of longer-chain (≧3 connecting atoms between the Si atom and the polymer chain) silane monomers, which are said to lead to a "more open structure". The use of longer-chain silane monomers is a disadvantage inasmuch as it leads to weaker crosslinking due to a higher degree of polymerization of the network chains (i.e. of the monomeric base units between two crosslinking sites), which additionally has an adverse effect on the material properties of the graft polymer.

DE 195 16 457 describes a crosslinkable adhesive composition comprising at least 50 wt. % of a silane-grafted polyolefin and additionally a carboxylic acid-grafted polyolefin. Poly(ethylene-co-vinyl acetate), polypropylene, polyethylene, poly(ethylene-co-methacrylate) and poly(ethylene-co-methacrylic acid) are mentioned as base polymers for the grafting. Because of the base polymers used and the grafting monomers used, the products described are not suitable for the desired fields of use.

EP 1 508 579 describes (silane-)modified crystalline polyolefin waxes. The waxes used are prepared by means of metallocene catalysis and have a high propylene content. Because of their wax-like properties and the resulting poor adhesive properties, the polymers described are not suitable for the intended fields of use. A high functionalization according to the present requirement conditions is not to be achieved because of the material properties of the base polymers employed.

WO 2007/001694 describes adhesive compositions which contain functionalized polymers (e.g. silane-grafted or maleic anhydride-grafted propylene polymers). The base polymers are prepared with metallocene catalysts and do not have the material properties required for achieving high rates of functionalization.

WO 2007/002177 describes adhesive compositions based on poly(propylene) random copolymers and functionalized polyolefin copolymers and non-functionalized adhesive resins, wherein the poly(propylene) random copolymers have a melt enthalpy of from 0.5 to 70 J/g and a content of isotactic propylene triads of at least 75 (particularly preferably >90%), and the functionalized (syndiotactic) polymers used have a content of functional monomer units of at least 0.1% and in the case of syndiotactic polymers are present in the adhesive composition with a content of <5 wt. %. The poly(propylene) random copolymers described are preferably prepared by metallocene catalysis, the polydispersity being stated on the one hand as 1.5 to 40 and on the other hand as 1.8 to 5. The former range has a wide span which is unusual for metallocene-catalyzed polymers, which indicate a multimodal molecular weight distribution and the simultaneous presence of several catalyst species. The melting range mentioned of from 25 to 105° C., which has several melting peaks of different intensity, points in the same direction, the limit of 105° C. stated having an unusually low value for polypropylene polymers, in particular for isotactic polypropylene polymers. The functionalized polyolefin copolymers include functionalized poly(propylene) random copolymers, syndiotactic polypropylene copolymers and so-called isotactic-atactic polypropylene graft polymers. Maleic anhydride and glycidyl methacrylates in particular, but also diverse other functional groups, such as e.g. vinylsilanes, are mentioned as functional monomer units. Because of the sometimes very high content of isotactic polypropylene units (with severe free radical degradation of the polymer), a poor ratio of grafting/functionalization to chain cleavage is established. The upper limit mentioned for the melting range ensures a low heat resistance of the corresponding bonds. The syndiotactic polypropylene polymers described are moreover expensive and scarcely available on the market.

WO 2007/008765 describes the use of low-viscosity silane-grafted poly(ethylene-co-1-olefin) polymers as an adhesive raw material. The polymers employed for the modification have an ethylene content of at least 50 mol % of ethylene and preferably a polydispersity of from 1 to 3.5, the total band width being stated as 1 to 5. They have a low melt viscosity of a minimum of 2,000 and a maximum of 50,000 cP at 177° C. 1-Olefin comonomers which are mentioned are numerous higher 1-olefins, such as e.g. 1-hexene and 1-octene, but also some branched 1-olefins, such as e.g. 3-methyl-1-pentene, and diverse further monomers, such as e.g. dienes, styrene etc., which do not meet the previous requirement of "1-olefin" and therefore lead to polymers with completely different material properties. In particular, diene polymers tend towards crosslinking and the formation of gel particles when employed in peroxidic processes. This is intensified by the presence according to the invention of vinyl end groups in the base polymers. The silane-grafted polymers have very low failure temperatures of only >43° C. (PAFT) and >60° C. (SAFT). The use of polyolefins having a high ethylene content necessarily means the presence of long ethylene blocks in the polymer. This in turn leads to poor wetting and adhesion properties on many surfaces of plastic, so that very many bonding problems cannot be solved in an optimum manner. Long polyethylene sequences moreover tend towards peroxidic crosslinking (which is utilized industrially inter alia in the production of cable sheathings), as a result of which gel formation is unavoidable. The non-grafted base polymers have a relatively low molecular weight and a melt viscosity of a maximum of 50,000 cP at 177° C. As is known, the molecular weight (and therefore also the melt viscosity) is degraded by chain cleavage in a peroxidically induced grafting reaction. Corresponding polymers having high rates of functionalization therefore necessarily have very low molecular weights/melt viscosities and are not suitable for many fields of application. As is known, the polydispersity of the polymers used is likewise reduced further by peroxidically induced grafting reactions. The modified polymers consequently have a polydispersity of significantly less than 3.5, which leads to diverse disadvantages above all in the processing properties. The use of relatively low molecular weight base polymers generally leads to rather low rates of functionalization. Resin compositions which already contain crosslinked poly(ethylene-co-1-olefin) polymers are likewise described. Such compositions comprising rubber-like constituents are not suitable for visually exacting uses (poor surface structure) and furthermore cannot be processed in many conventional application installations (e.g. melt spraying) in the adhesives sector (blocking of the application nozzles). The hot melt adhesives described as a use chiefly have low melt viscosities. The use of crystalline and partly crystalline poly(propylene-co-1-olefin) polymers, which are likewise said to be suitable for the grafting, is likewise described. These have a propylene content of at least 50 mol % and preferably likewise a melt viscosity of a maximum of 50,000 cP at 177° C. (before the grafting and after the grafting) and a polydispersity of from 1 to 3.5. The crystallinity is stated as a maximum of 2-60% (i.e. 3-100 J/g) and is therefore essentially in the region of high crystallinity. This in turn has the effect of poor wetting of and poor adhesion to polyolefin surfaces and rules out numerous fields of application.

EP 0827994 describes the use of silane-grafted amorphous poly(alpha-olefins) as a moisture-crosslinking adhesive raw material or adhesive. Base polymers which are employed are atactic polypropylene (aPP), atactic poly(1-butene) or, preferably, co- or terpolymers of $C_4$-$C_{10}$ alpha-olefins (0-95 wt. %), propene (5-100 wt. %) and ethylene (0-20 wt. %). The silane-modified APAO described in the examples has a softening point of 98° C., a needle penetration of 15*0.1 mm and a melt viscosity of 6,000 mPa*s. The atactic polyolefins and APAOs used have a relatively low molecular weight and a relatively low crystallinity, which during the modification leads to products of low flexibility which have a low functionality and a low tensile strength, and are therefore not suitable for many uses.

With respect to the solubility of polypropylene polymers in aromatic solvents and/or ethers, there are numerous publications in the scientific literature. It has thus been found, for example, that the content of xylene-soluble constituents in an isotactic poly(propylene) homopolymer which has been obtained by metallocene catalysis is conventionally significantly <1 wt. %, and in random copolymers with ethylene, depending on the ethylene content, xylene-soluble contents of a maximum of 5 wt. % have been found (W. Spaleck in: "Metallocene based Polyolefins"; J. Scheirs, W. Kaminsky (eds.); J. Wiley & Sons; Weinheim; 1999).

There was therefore a need for functionalized polyolefins with improved material properties, in particular for such polyolefins which have a high degree of functionalization, also in combination with a relatively high molecularity/melt viscosity, and a rapid reactive binding to functional surfaces, in particular on glass and wood, a very good adhesion to untreated polypropylene and a rapid speed of crosslinking and high tensile strengths in the non-crosslinked and crosslinked state. It has been found, surprisingly, that polyolefins according to the present invention meet the complex profile of requirements and are therefore suitable in particular for use in or as an adhesive.

The present invention accordingly first provides a modified polyolefin which has a certain content of propylene chain elements and ethylene chain elements and which is chosen in particular from poly(ethylene-co-propylene) and poly(ethylene-co-propylene-co-1-butene), in that has a melt enthalpy in a certain range and a minimum solubility in xylene and tetrahydrofuran (THF) at room temperature, wherein the melt enthalpy, determined during the 2nd heating by means of differential scanning calorimetry (DSC), of the base polymer employed for the modification is at least 9 J/g and a maximum of 20 J/g, its solubility in xylene at room temperature (i.e. the content of the polymer sample which is soluble in xylene in a standardized solution test) is at least 96 wt. % and in tetrahydrofuran at room temperature (i.e. the content of the polymer sample which is soluble in tetrahydrofuran in a standardized solution test) is at least 67 wt. %, the content of propylene, determined by $^{13}$C-NMR spectroscopy, is between 50 and 75 wt. % and the content of poly(ethylene)triads (based on the ethylene content of the polymer), determined by $^{13}$C-NMR spectroscopy, is a maximum of 2.5 wt. %, one or more silanes being grafted on to the polyolefin.

The specifically selected polyolefins according to the invention are suitable in particular and preferably for the production of bonds and show decisive advantages there compared with the known polymers. The polyolefins according to the present invention thus have a very high degree of functionalization also at high melt viscosities, a very good adhesion to untreated polyolefin surfaces and a rapid reactive binding to functional surfaces and a rapid speed of crosslinking. Due to a high degree of grafting (corresponds to a high crosslinking density in the crosslinked state), after the crosslinking a high material cohesion is achieved, which leads both to very high tensile strengths and to very high adhesive shear strengths, the non-crosslinked modified polyolefin having a high flexibility and a moderate softening point, that is to say also being suitable for bond heat-sensitive materials. The specific polymer composition and the specific material properties of the base polymer employed is/are essential for the positive properties of the polyolefins according to the invention. This comprises between 50 and 75 wt. % of propylene, preferably 52 to 72 wt. %, particularly preferably 55 to 70 wt. % and especially preferably 57 to 68 wt. %. The total content (likewise determined by $^{13}$C-NMR spectroscopy) of ethylene triads in the base polymer according to the invention is a maximum of 2.5 wt. %, based on the ethylene content, likewise determined via $^{13}$C-NMR spectroscopy, of the base polymer, preferably a maximum of 2.3 wt. %, particularly preferably a maximum of 2.1 wt. % and especially preferably between 0.1 and 2 wt. %, further preferred ranges being between 0.15 and 1 wt. % and between 1.1 and 1.9 wt. %.

The basic physical properties of the modified polymers according to the invention are established by the content according to the invention of propylene. The comonomers according to the invention, ethylene and/or 1-butene, allow in this context a fine adjustment of the crystallinity, ethylene in particular being particularly suitable for this, since on the one hand it has a particularly marked influence on the crystallinity of polypropylene [S. Davison, G. L. Taylor; Br.Polym.J.; 4 (1972); 65 et seq.], and on the other hand also no cocrystallization with poly(1-butene) takes place [A. Turner-Jones; Polymer; 7 (1966); 23 et seq.]. If comonomers are incorporated in block form (e.g. as triads), their effectiveness as agents which impair crystallization drops significantly compared with a random distribution. On the other hand, the presence of small amount of ethylene blocks is essential in particular for achieving a certain minimum flexibility of the non-modified polymers according to the invention. The crystallinity according to the invention of the non-modified base polymers leads to a good material cohesion of the polymers modified according to the invention and at the same time ensures low needle penetration values. At the same time, via the limitation of the propylene content and the specific comonomer mixture, a polymer is provided which has a high resistance to β-scission (chain cleavage after hydrogen abstraction) and thus leads to a modified graft polymer having a high molecular weight and high rates of functionalization.

For the polymers according to the invention, the content of comonomer results from 100 wt. % minus the propylene content, it being possible to use either one or two comonomers.

In a particularly preferred embodiment, the base polymer is a poly(ethylene-co-propylene) with an ethylene content of at least 15 wt. %, preferably of at least 17 wt. %, particularly preferably from 17 to 20 wt. % and especially preferably from 19 to 25 wt. %. This monomer combination has the advantage that it renders possible the preparation of base polymers of higher flexibility, which also lead to polymers modified according to the invention of higher flexibility. So that the corresponding content of etyhlene triads is not exceeded in the preparation of poly(ethylene-co-propylene) polymers, it is necessary to adapt the polymerization conditions. In particular, a polymerization catalyst with random incorporation of comonomers must be chosen, and a low monomer concentration at the reaction site must be realized.

In a further particularly preferred embodiment, the base polymer is a poly(ethylene-co-propylene-co-1-butene) with a combined content of ethylene and 1-butene of at least 15 wt. %, preferably at least 17 wt. %, particularly preferably between 17 and 50 wt. % and especially preferably between 17 and 48 wt. %, further particularly preferred embodiments having a combined content of ethylene and 1-butene of from 20 to 34 wt. % or 36 to 46 wt. %.

Since the solubility of polypropylene depends both on the molecular weight and on its crystallinity, a corresponding fractionation can take place via solution experiments [A. Lehtinen, Macromol. Chem.Phys.; 195 (1994); 1539 et seq.].

It has been known for a long time that by means of extraction with ether, amorphous atactic contents [J. Boor; "Ziegler-Natta Catalysts and Polymerization"; Academic Press; New York; 1979] and low molecular weight contents of low crystallinity [G. Natta, I. Pasquon, A. Zambelli, G. Gatti; Makromol. Chem.; 70 (1964); 191 et seq.] can be obtained from polypropylene polymers. On the other hand, highly crystalline isotactic polymers have a very low solubility both in aliphatic solvents and in ethers, and in particular also at elevated temperature [B. A. Krentsel, Y. V. Kissin, V. I. Kleiner, L. L. Stotskaya; "Polymers and Copolymers of higher 1-Olefins"; p. 19/20; Hanser Publ.; Munich; 1997]. The soluble polymer contents in general have no or only a very low crystallinity and show no melting point [Y. V. Kissin; "Isospecific polymerization of olefins"; Springer Verlag; New York; 1985]. Polypropylene oligomers which are soluble in tetrahydrofuran have very low number-average molecular weights of significantly less than 1,500 g/mol [H. El Mansouri, N. Yagoubi, D. Scholler, A. Feigenbaum, D. Ferrier; J. Appl. Polym. Sci.; 71 (1999); 371 et seq.].

The non-modified (non-grafted) base polymers employed and their mixtures with partly crystalline and/or crystalline propylene polymers are distinguished in that their solubility in xylene at room temperature (i.e. the content of polymer sample which dissolves in xylene in a standardized solution test) is at least 96 wt. %, preferably at least 96.5 wt. %, particularly preferably at least 97 wt. % and especially preferably at least 97.5 wt. %. This has the advantage that the polymers according to the invention contain a balanced ratio of crystalline, partly crystalline and non-crystalline polymer contents which first render possible the particular material properties of the modified polymer according to the invention.

The non-modified (non-grafted) base polymers employed are distinguished in that their solubility in tetrahydrofuran (THF) at room temperature (i.e. the content of polymer sample which dissolves in tetrahydrofuran in a standardized solution test) is at least 67 wt. %, preferably at least 68 wt. %, particularly preferably at least 70 wt. % and especially preferably at least 72 wt. %. This has the advantage that the polymers or polymer mixtures according to the invention contain a sufficient amount of atactic polymer contents and of polymer molecules of low to medium chain length, which is important for the flexibility of the modified polymer according to the invention and its adhesion also many polymer substrates.

The non-modified (non-grafted) base polymers employed are distinguished in that their melt viscosity at 190° C., determined by oscillation rheometry at a shear rate of 1 Hz and a deformation of a maximum of 1%, is 50,000 to 3,000,000 mPa*s, preferably 55,000 to 1,500,000 mPa*s, particularly preferably 60,000 to 1,000,000 mPa*s and especially preferably 75,000 to 750,000 mPa*s, the ranges of from 100,000 to 200,000 mPa*s, from 175,000 to 290,000 mPa*s, from 300,000 to 450,000 mPa*s and from 400,000 to 720,000 mPa*s furthermore being particularly preferred. In this context, the melts of the base polymers according to the invention show both viscoelastic and structural viscosity properties.

The softening point of the non-modified (non-grafted) base polymers, measured by means of the ring and ball method, is 90 to 130° C., preferably 93 to 127° C., particularly preferably 95 to 125° C. and especially preferably from 98 to 122° C., further preferred ranges being between 98 and 105° C., between 106 and 117° C. and between 118 and 121° C. This has the advantage that for modification of the base polymers, especially if this is carried out on the basis of a polymer melt, only a relatively low amount of energy is necessary, since the modification can already take place at relatively low temperatures.

The needle penetration of the non-modified (non-grafted) base polymers is between 10 and 25 *0.1 mm, preferably between 12 and 23 *0.1 mm, particularly preferably between 13 and 21 *0.1 mm and especially preferably between 14 and 19 *0.1 mm. This has the advantage that a balanced ratio exists between strength (hardness) and flexibility.

The melt enthalpy, determined in the 2nd heating by differential scanning calorimetry (DSC), of the non-modified (non-grafted) base polymer is between 9 and 20 J/g, preferably between 10 and 18 J/g, particularly preferably between 11 and 17 J/g and especially preferably between 12 and 15 J/g.

This has the advantage that a certain basic cohesion exists, which can be built up during a later modification or crosslinking.

The glass transition temperature, determined by DSC, of the non-modified (non-grafted) base polymers is a maximum of −20° C., preferably a maximum of −23° C., particularly preferably a maximum of −25° C. and especially preferably lower than −27° C. The polymers according to the invention are accordingly also suitable for use at very low temperatures and in particular have a good low temperature flexibility, which distinguishes them e.g. from corresponding polymers with a high to very high propylene content ($T_g$>10° C.).

In the polyolefins according to the invention, one or more silanes are grafted on to the abovementioned base polymers. The silane to be grafted on preferably has olefinic double bonds and one to three alkoxy groups bonded directly to the silicon atom. In particular, the one or more silanes are chosen from the group including vinyltrimethoxysilane (VTMO), vinyltriethoxysilane, vinyl-tris(2-methoxy-ethoxy)silane, 3-methacryloxypropyltrimethoxysilane (MEMO; $H_2C=C(CH_3)COO(CH_2)_3-Si(OCH_3)_3$), 3-methacryloxypropyltriethoxysilane, vinyldimethylmethoxysilane and/or vinylmethyldibutoxysilane. The silane is very particularly preferably vinyltrimethoxysilane. Via the use of various silane monomers, the material properties of the modified polyolefins according to the invention can be adapted exactly to the particular requirements of the present use. Thus e.g. the speed of crosslinking and the compatibility with other polymers (such as e.g. formulation constituents) can be varied.

The polymers modified with the silanes have particular properties which lead to the abovementioned advantages during use thereof. Thus, the melt viscosity of the modified (grafted) polyolefin according to the invention in the non-crosslinked state, determined by oscillation rheometry at 1 Hz and a deformation of a maximum of 1% at 190° C., is 1,000 to 75,000 mPa*s, preferably 1,500 to 65,000 mPa*s, particularly preferably 2,000 to 60,000 mPa*s and especially preferably 2,500 to 55,000 mPa*s, further preferred ranges being between 3,000 and 7,500, 8,000 and 15,000, 16,000 and 22,000 and between 25,000 and 45,000 mPa*s. In this context, the melts of the modified polymers according to the invention show both viscoelastic and structural viscosity properties. Modified polyolefins are thus provided which due to their variable melt viscosity in the non-crosslinked state are suitable for the most diverse methods of application, and accordingly can also be employed in the most diverse fields of use (e.g. hot melt adhesives, sealing compositions, molding compositions, primers etc.). It is a particular feature of the modified polyolefins according to the invention that their structural viscosity (i.e. the dependence of the melt viscosity on the shear rate) in the non-crosslinked state increases with increasing molecular weight. The softening point of the non-crosslinked modified (grafted) polyolefin according to the invention, measured by means of the ring and ball method, is 80 to 120° C., preferably 85 to 117° C., particularly preferably 87 to 115° C. and especially preferably from 90 to 112° C., further preferred ranges being between 90 and 99° C. and between 98 and 110° C. Modified polyolefins are thus provided which on the one hand have a moderate softening point, i.e. in the non-crosslinked state already lead to a sufficient heat resistance of a bond produced using the modified polyolefins according to the invention, but on the other hand also allow processing (above all in the melt) at moderate processing and application temperatures, and are therefore also suitable for heat-sensitive uses.

The needle penetration of the non-crosslinked modified polyolefins according to the invention is between 10 and 40 *0.1 mm, preferably between 12 and 35 *0.1 mm, particularly preferably between 14 and 32 *0.1 mm and especially preferably between 17 and 30 *0.1 mm. Modified polyolefins are therefore provided which in the non-crosslinked state have a good balance between strength/hardness and flexibility. The tensile strength of the modified polyolefins according to the invention in the non-crosslinked state (without further additives) is between 0.5 and 7 MPa, preferably between 0.6 and 6.5 MPa, particularly preferably between 0.7 and 6.0 MPa and especially preferably between 0.75 and 5.5 MPa, further preferred ranges being between 0.8 and 1.5 MPa, between 1.3 and 25 MPa, between 2.0 and 3.5 MPa and between 2.5 and 5.0 MPa. A high basic cohesion in the non-crosslinked state is ensured in particular as a result. The elongation at break, determined in the tensile test, of the modified polyolefins according to the invention in the non-crosslinked state (without further additives) is between 75 and 1,000%, preferably between 90 and 950%, particularly preferably between 100 and 900% and especially preferably between 110 and 800%, further preferred ranges being between 200 and 450%, between 350 and 600% and between 500 and 750%. Modified polyolefins are thereby provided which in the non-crosslinked state have a high degree of flexibility.

The tensile strength of the modified polyolefins according to the invention in the crosslinked state without further additives and after a storage time of the standard test specimens of 40 day in a climatically controlled cabinet at 20° C. and 65% relative atmospheric humidity is at least 50% higher than in the non-crosslinked state, preferably at least 60% higher, particularly preferably at least 75% higher and especially preferably at least 100% higher, a value of at least 2.0 MPa, preferably of at least 2.5 MPa, particularly preferably of at least 2.75 MPa and especially preferably of at least 3.0 MPa being reached as the tensile strength after storage for 40 days.

In a particular embodiment, in particular if the silicon content, determined by x-ray fluorescence spectroscopy (RFA spectroscopy) is >0.5 wt. %, preferably >0.6 wt. % and particularly preferably >0.7 wt. %, and the melt viscosity, determined by oscillation rheometry, of the non-crosslinked polymer at 190° C. (1 Hz, 1% deformation) is <10,000 mPa*s, preferably <7,500 mPa*s, particularly preferably <5,000 mPa*s and especially preferably <4,000 mPa*s, the tensile strength of the modified polyolefins according to the invention in the crosslinked state without further additives and after a storage time of the standard test specimens of 40 days in a climatically controlled cabinet at 20° C. and 65% relative atmospheric humidity is at least 150%, preferably at least 200%, particularly preferably at least 250% and especially preferably more than 300% above the value achieved in the non-crosslinked state. In this case, the tensile strength of the modified polyolefins according to the invention (without further additives) in the crosslinked state after a storage time of the standard test specimen of 40 days in a climatically controlled cabinet at 20° C. and 65% relative atmospheric humidity is preferably at least 3.5 MPa. Modified polyolefins are therefore provided which because of their specific material characteristics, such as e.g. a very high degree of grafting (with a simultaneously low melt viscosity in the non-crosslinked state), can cure by crosslinking of the reactive groups to give compounds having a very high strength. In a particular embodiment, the elongation at break of the modified polyolefins according to the invention (standard test specimens), determined in the tensile test without further additives and after a storage time of 40 days in a climatically controlled cabinet at 20° C. and 65% relative atmospheric humidity, increases in spite of the crosslinking, and in the crosslinked state is at least 110%, preferably at least 120%, particularly preferably between 130 and 500% and especially preferably between 150 and 400% of the value achieved in the non-crosslinked state. The polymers according to the invention thus also have, in spite of the crosslinking which occurs during storage and the associated increase in the material cohesion (see tensile strength), a high flexibility after the crosslinking, it being possible for this to be matched individually to the given requirements by the copolymer composition of the base polymer used, via the initiator used or the initiator-grafting monomer combination used, via the ratio of amounts of initiator to grafting monomer and via the reaction conditions (in particular dwell time and reaction temperature). In a further particularly preferably embodiment, the elongation at break decreases continuously as the crosslinking progresses (storage time), an elongation at break which corresponds to at least 50% of the value achieved in the non-crosslinked state, preferably at least 55%, particularly preferably at least 60% and especially preferably at least 65% being achieved after 40 days of storage of the standard test specimens in a climatically controlled cabinet at 20° C. and 65% relative atmospheric humidity.

By the crosslinking, the flexibility of the modified polymers according to the invention can therefore be both increased and reduced, depending on the profile of requirements which exists. The modified polyolefins according to the invention have (after unreacted residual monomer has been completely separated off) a silicon content, determined by RFA spectroscopy (x-ray fluorescence spectroscopy), of at least 0.3 wt. %, preferably of at least 0.35%, particularly preferably of at least 0.4 wt. % and especially preferably of 0.45-2 wt. %, further particularly preferred ranges being between 0.5 and 0.75 wt. %, between 0.7 and 0.95 wt. %, between 0.8 and 1.25 wt. % and between 1.1 and 2 wt. %.

Polyolefins having the preferred properties mentioned are very particularly suitable for bonds, in particular for use as or in hot melt adhesives, and show advantageous properties compared with known systems. This applies in particular to their excellent adhesion on non-treated polyolefins, in particular on non-treated polypropylene and paper/card, wood, glass and or metals, in particular aluminum.

The present invention also provides processes for the preparation of a modified polyolefin according to the invention, characterized in that a partly crystalline polyolefin having a content of propylene, determined by $^{13}$C-NMR spectroscopy, of from 50 to 75 wt. % and having a content of ethylene triads, determined by $^{13}$C-NMR spectroscopy, of a maximum of 2.5 wt. %, based on the content of ethylene, likewise determined by $^{13}$C-NMR spectroscopy, and a melt enthalpy, determined by means of DSC (2nd heating), of from 9 to 20 J/g and a solubility in xylene at room temperature (i.e. the content of the polymer sample which dissolves in xylene in a standardized solution test) of at least 96 wt. % and a solubility in tetrahydrofuran (THF) at room temperature (i.e. the content of the polymer sample which dissolves in tetrahydrofuran in a standardized solution test) of at least 67 wt. % is brought into contact with at least one free radical initiator and one or more silanes, after which a grafting reaction of the one or more silanes takes place on the polyolefin.

The base polymer according to the invention is prepared by polymerization of the monomers mentioned.

The polymers according to the invention are obtainable, for example, by polymerization of propylene optionally with ethylene and/or 1-butene with a $TiCl_3 \cdot (AlCl_3)_n$ mixed catalyst (n=0.2 to 0.5), a trialkylaluminum compound being employed as a co-catalyst. The monomer ethene is employed in gaseous form, while the monomers propene and 1-butene can be employed in either gaseous or liquid form. Gaseous hydrogen, for example, can be used as a molecular weight regulator. The polymerization is preferably carried out in an inert solvent, which is chosen e.g. from the group of aliphatic hydrocarbons. A polymerization in monomer which has been initially introduced into the polymerization vessel is likewise possible. The polymerization is carried out either in a stirred tank or in a cascade of stirred tanks. The reaction temperature is between 30 and 200° C. The polymers according to the invention can be stabilized chemically, according to the prior art, either in the form of their reaction solution or at a later point in time in order to protect them from the harmful influence e.g. of sunlight, atmospheric humidity and oxygen. In this context, for example, stabilizers which comprise hindered amines (HALS stabilizers), hindered phenols, phosphites and/or aromatic amines (such as e.g. tetrakis(methylene-(3,5-ditert-butyl-4-hydroxyhydrocinnamate) and/or 2,4,8,10-tetraoxa-3,9-diphosphaspiro-3,9bis(octydecyl)[5,5] undecane) can be employed. Such stabilizers which contain only one hydrolytically active end group are particularly preferably employed. The active amount of stabilizers in this context is in the range of from 0.1 to 2 wt. %, based on the polymer.

Suitable silanes for the grafting are mentioned above in the description of the olefins, and they are preferably those from the group comprising vinyltrimethoxysilane, vinyltriethoxysilane, vinyl-tris(2-methoxy-ethoxy-)silane, 3-methacryloxypropyltrimethoxysilane, 3-methacryloxypropyltriethoxysilane, vinyldimethylethoxysilane and/or vinylmethyldibutoxysilane, in particular vinyltrimethoxysilane. The silane is conventionally employed in the grafting in amounts of from 0.1 to 20 wt. %, preferably 0.5 to 17 wt. %, particularly preferably from 0.75 to 15 wt. % and especially preferably from 1 to 14 wt. %, based on the base polymer, further particularly preferred ranges being between 0.75 and 5.5 wt. %, between 3.5 and 7.5 wt. %, between 7 and 9.75 wt. % and between 9.5 and 13.75 wt. %.

The one or more silanes can be grafted on to the base polymer by all the methods of the prior art, for example in solution or preferably in the melt, one or more donors of free radicals being employed in a sufficient amount. A suitable working procedure can be found in DE-OS 40 00 695, to which reference is expressly made. For example, the following donors of free radicals can be used: diacyl peroxides, such as e.g. dilauryl peroxide or didecanoyl peroxide, alkyl peresters, such as e.g. tert-butyl peroxy-2-ethylhexanoate, perketals, such as e.g. 1,1-di(tert-butylperoxy)-3,3,5-trimethylcyclohexane or 1,1-di(tert-butylperoxy)cyclohexane, dialkyl peroxides, such as e.g. tert-butyl cumyl peroxide, di(tert-butyl) peroxide or dicumyl peroxide, donors of C radicals, such as e.g. 3,4-dimethyl-3,4-diphenylhexane or 2,3-dimethyl-2,3-diphenylbutane, and azo compounds, such as e.g. azobisisobutyronitrile, 2,2'-azo-di(2-acetoxypropane) etc. The grafting on is carried out in particular at a temperature of from 30 to 250° C.

In a particular embodiment, it is a solution process, it being possible to employ aliphatic and/or aromatic hydrocarbons and cyclic ethers as solvents. Particularly preferably, at least one aromatic hydrocarbon is employed as the solvent. Suitable aromatic hydrocarbons are, in particular, trichlorobenzene, dichlorobenzene, toluene and xylene, and xylene is particularly preferably employed. Particularly preferred aliphatic hydrocarbons are, for example, propane, n-butane, hexane, heptane, cyclohexane and octane. A particularly preferred cyclic ether is tetrahydrofuran (THF).

If ethers, in particular cyclic ethers, are used as solvents, the initiator used and the reaction conditions must be chosen with particular caution, in order to suppress or to control the formation of explosive peroxides of the ethers used. In particular, the additional use of specific inhibitors (e.g. IONOL) is to be considered.

In the case of a grafting process in solution, the concentration of the base polymer employed is at least 10 wt. %, preferably at least 15 wt. %, particularly preferably at least 20 wt. % and especially preferably at least 22.5 wt. %. The reaction temperature of the grafting process in solution is 30 to 200° C., preferably 40 to 190° C., particularly preferably 50 to 180° C. and especially preferably 55 to 140° C. The solution grafting is carried out either in a discontinuous or in a continuous manner. In the case of a discontinuous reaction procedure, the solid polymer (e.g. as granules, a powder etc.) is first dissolved in the solvent used. Alternatively to this, a conditioned polymerization solution from the preparation process of the base polymer is used directly and brought to the reaction temperature. The addition of the monomer(s) and the free radical initiator(s) follows. In a particularly preferred embodiment, the solvent, base polymers(s) and monomer(s) are initially introduced into the polymerization vessel and brought to the reaction temperature, while the free radical initiator(s) is/are metered in continuously over a defined period of time. This has the advantage that the stationary free radical concentration is low, and the ratio of grafting reaction to chain cleavage is therefore particularly favorable (i.e. more grafting reaction and less chain cleavage). In a further particularly preferred embodiment, the solvent and base polymer(s) are initially introduced into the polymerization vessel and brought to the reaction temperature, while monomer(s) and free radical initiator(s)—together (e.g. in the form of a mixture) or separately from one another—are metered in continuously over a defined period of time. This has the advantage that both the stationary free radical concentration and the monomer concentration at the site of the reaction are low, which suppresses both the chain cleavage and the formation of homopolymers. This is important in particular if monomers which tend greatly towards thermally initiated (homo)polymerization at the reaction temperature are employed. Very particularly preferably, after the various defined metering periods, a further amount of free radical initiator(s) is metered in to minimize the content of residual monomers in the reaction solution. A stirred tank is preferably used as the reactor, and the use of alternative reaction containers, such as e.g. discontinuous kneading reactors, is likewise possible, and is preferred in particular at low reaction temperatures and/or high polymer concentrations.

In the case of a continuous reaction procedure, the solid polymer is first dissolved in at least one solvent in one or more reservoir containers (e.g. stirred tanks) and the solution is then metered continuously into the reaction container(s). In an alternative embodiment which is likewise particularly preferred, a conditioned polymer solution from a preparation process of the base polymer is used directly. In a further embodiment which is likewise particularly preferred, the solid polymer (e.g. in the form of a powder, granules, pellets etc.) is metered continuously together with at least one solvent into a (single- or multi-screw) worm machine or a conti-kneader and dissolved under the action of heat and/or shearing forces and the solution is then metered continuously into the reaction container(s). Possible reaction containers or reactors for carrying out the continuous grafting reaction in solution are continuous stirred tanks, cascades of stirred tanks, flow tubes, flow tubes with forced conveying (e.g. worm machines), reaction kneaders and any desired combinations thereof. If flow tubes with forced conveying are employed, these are preferably extruders, it being possible for both single-, twin- and also multi-screw extruders to be employed. Twin- and/or multi-screw extruders are particularly preferably employed. The use of a reactor combination of flow tube, flow tube with forced conveying and continuous stirred tank in any desired sequence is particularly preferred for the continuous preparation of the modified polymers according to the invention in solution, the removal of residual monomers and volatile by-products/degradation products preferably also taking place either in the flow tube with forced conveying or in the continuous stirred tank.

Alternatively, the process is preferably a melt process, at least one free radical initiator being metered directly into the melt. In particular, in this process variant the temperature of the polymer mass at the time of the metering of at least one free radical initiator is above the SADT (self accelerating decomposition temperature=temperature above which a self-accelerating decomposition can occur) of at least one of the free radical initiators metered in.

The reaction temperature of the grafting process in the melt is 160 to 250° C., preferably 165 to 240° C., particularly preferably 168 to 235° C. and especially preferably 170 to 230° C.

The melt grafting is carried out either in a discontinuous or in a continuous procedure. In the case of a discontinuous reaction procedure, the solid polymer (e.g. as granules, a powder, pellets etc.) is first melted and optionally homogenized. Alternatively, a conditioned polymer melt from a polymerization process is used and brought to the reaction temperature. The addition of monomer(s) and free radical initiator(s) follows.

In a particular embodiment, the monomer(s) and polymer melt are thoroughly mixed homogeneously and brought to the reaction temperature, while the free radical initiator(s) are metered in continuously over a defined period of time. This has the advantage that the stationary free radical concentration is low, and the ratio of grafting reaction to chain cleavage is therefore particularly favorable (i.e. more grafting reaction and less chain cleavage).

In a further particularly preferred embodiment, the polymer melt is initially introduced into the polymerization vessel and homogenized, while monomer(s) and free radical initiator(s) are metered in continuously together (e.g. in the form of a mixture) or separately over a defined period of time. This has the advantage that both the stationary free radical concentration and the monomer concentration at the site of the reaction remains low, which suppresses both the chain cleavage and the formation of homopolymer. The latter is important in particular if monomers which tend towards thermal (homo)polymerization at the reaction temperature present are used. A stirred tank with a wall-accessible stirrer unit or a reaction kneader is preferably used as the reactor.

In the case of a continuous reaction procedure, the solid polymer is first melted in one or more reservoir containers (e.g. stirred tanks) and is then metered continuously into the reaction container(s). In an alternative embodiment which is likewise particularly preferred, a conditioned polymer melt from a polymerization process is used. In a further embodiment which is likewise particularly preferred, the solid polymer (e.g. in the form of a powder, granules, pellets etc.) is metered continuously into a (single- or multi-screw) worm machine or a conti-kneader, melted under the action of heat and/or shearing forces and then metered continuously into the reaction container(s). Possible reaction containers or reactors for carrying out the continuous grafting reaction in the melt are continuous stirred tanks, cascades of stirred tanks, flow tubes, flow tubes with forced conveying (e.g. worm machines), reaction kneaders and any desired combinations thereof. If flow tubes with forced conveying are employed, these are preferably extruders, both single-, twin- and also multi-screw extruders being employed. Twin- and/or multi-screw extruders are particularly preferably employed. The use of a reactor combination of flow tube, flow tube with forced conveying and continuous stirred tank in any desired sequence is particularly preferred for the continuous preparation of the modified polymers according to the invention in the melt, the removal of residual monomers and volatile by-products/degradation products also taking place either in the flow tube with forced conveying or in the continuous stirred tank.

The modified polymers according to the invention are suitable in the crosslinked or non-crosslinked state for use in or as molding compositions, protective compositions, adhesives, marking compositions, coating compositions, sealing sheets or roofing felts, primers, primer formulations, adhesion promoter formulations, dispersions, suspensions and/or emulsions. The present invention likewise accordingly provides the use of the modified polyolefins according to the invention in the fields of use mentioned and corresponding molding compositions, protective compositions, adhesives, marking compositions, coating compositions, sealing sheets or roofing felts, primers or primer formulations, adhesion promoter formulations, dispersions, suspensions and/or emulsions containing the polyolefins according to the invention.

The polyolefins according to the invention are particularly suitable for use as and/or in molding compositions. The molding compositions can moreover comprise further constituents. The further constituents can include, in particular, other polymers, it being possible for these other polymers to be one or more ethylene polymers, and/or isotactic propylene polymers and/or syndiotactic propylene polymers and/or isotactic poly-1-butene polymers and/or syndiotactic poly-1-butene polymers. Preferably, in this context the molding compositions are those which, apart from at least one polymer according to the invention, comprise a further modified and/or non-modified polyolefin, in particular polypropylene, and/or fillers and/or reinforcing materials, such as e.g. glass fibers.

The modified polyolefins according to the invention are particularly suitable for use as and/or in protective compositions. Preferably, in this context the protective compositions are those which, apart from at least one polymer according to the invention, comprise a further modified and/or non-modified polyolefin, in particular polypropylene, and/or fillers and/or reinforcing materials, such as e.g. glass fibers. In particular, the protective compositions according to the invention are those which are employed in the automobile sector. They are very particularly preferably underseal compositions (PVC plastisol substitute).

The modified polyolefins according to the invention are particularly suitable for use as and/or in adhesives.

To establish the properties necessary for the adhesives user, such as adhesive strength, initial adhesion, speed of crosslinking, crosslinking density, viscosity, hardness, elasticity, heat stability and stability to oxidation etc., further substances which are conventionally used for establishing the desired adhesive properties can be added to the polyolefins according to the invention. In this context, it is of course to be remembered that water contained in the additives can increase the speed of crosslinking of the adhesive according to the invention. It is particularly characteristic of the present invention that a reactive binding to the additives used can take place via the silane groups of the polymers according to the invention. In particular, fillers and/or reinforcing materials (e.g. fibers) employed are bound reactively to the polymer matrix by the silane groups contained in the polymers according to the invention, which leads to particularly advantageous material properties, in particular a high material cohesion (tensile strength) and a very high resistance to tearing out of fiber reinforcements.

A further essential characteristic of the modified polyolefins according to the invention is that in addition to the fillers, chemical binding of the adhesive/adhesive constituent to the surfaces to be bonded can also take place. This leads to a particularly good adhesion and adhesive strength on surfaces which have corresponding reactive groups (e.g. —OH). In addition to the reactive binding, a particularly high adhesive strength is furthermore to be achieved on surfaces which have a similar surface polarity to the modified polyolefins according to the invention (e.g. poly(1-butene), polypropylene, polyethylene etc.).

The adhesive formulations according to the invention can comprise further constituents in addition to the modified polyolefins according to the invention. The further constituents can be, in particular in solution formulations, cyclic and/or linear aliphatic and/or aromatic hydrocarbons with or without hetero atoms, and also corresponding halogenated hydrocarbons. Preferably, however, no halogenated hydrocarbons are used. In the adhesive formulations which are liquid at room temperature, the hydrocarbons mentioned preferably have a content in the formulations of a maximum of 90 wt. %, preferably a maximum of 80 wt. %, particularly preferably a maximum of 75 wt. % and especially preferably a maximum of 50 wt. %.

The adhesive formulation according to the invention is very particularly preferably a hot melt adhesive formulation which can be employed for all the types of bonds known to the person skilled in the art.

The hot melt adhesive formulation according to the invention can comprise further constituents which are necessary to achieve specific properties, such as e.g. deformability, adhesive power, processability, speed of crosslinking, crosslinking density, (melt or solution) viscosity, strength, speed of crystallization, tackiness, storage stability etc. The content of further constituents in a particular embodiment of the present invention is particularly preferably a maximum of 10 wt. %. This has the advantage that the material properties of the adhesive formulation are essentially those of the polymer according to the invention used. Such an adhesive formulation can be prepared with a very low outlay.

Alternatively, in a further embodiment of the present invention the content of the further constituents is >10 wt. %. In this case, the further constituents make up a maximum of 80 wt. % of the total formulation, preferably a maximum of 60 wt. %, particularly preferably a maximum of 50 wt. %, especially preferably a maximum of 40 wt. %.

The further constituents can be crosslinking accelerators, in particular silanol condensation catalysts, inorganic and/or organic fillers, which can optionally be electrically conductive or insulating, inorganic and/or organic pigments, which can optionally be electrically conductive or insulating, synthetic and/or natural resins, in particular adhesive resins, synthetic and/or natural oils, inorganic and/or organic, synthetic and/or natural polymers, which can optionally be electrically conductive or insulating, inorganic and/or organic, synthetic and/or natural fibers, which can optionally be electrically conductive or insulating, inorganic and/or organic stabilizers and/or inorganic and/or organic flameproofing agents.

In particular, the further constituents include resins, the resins being employed to adapt certain properties of the adhesive layer, in particular the tackiness and/or adhesion, the flow and creep properties of the adhesive layer and/or the viscosity of the adhesive, to particular requirements. They can be natural resins and/or synthetic resins. In the case of natural resins, these natural resins contain as the main constituent abietic acid (e.g. colophony). The resins can furthermore be terpene or polyterpene resins, petroleum resins and/or coumarone-indene resins, which are in particular so-called $C_5$-resins and/or $C_9$-resins and/or copolymers of $C_5$-/$C_9$-resins. The content of resins in the hot melt adhesive formulation according to the invention is in particular a maximum of 45 wt. %, preferably between 1 and 40 wt. %, particularly preferably between 2 and 30 wt. % and especially preferably between 3 and 20 wt. %, based on the total formulation.

The hot melt adhesive formulations according to the invention can furthermore comprise conventional amorphous (or partly crystalline) poly($\alpha$-olefins) (so-called APAOs) as further constituents. The amorphous (or partly crystalline) poly($\alpha$-olefins) mentioned can be homo-/co- and/or terpolymers of ethylene, propylene, 1-butene or linear and/or branched 1-olefins having 5-20 carbon atoms, which are obtainable e.g. by conventional Ziegler-Natta catalysis or metallocene catalysis. The content of amorphous poly($\alpha$-olefins) is in particular a maximum of 50 wt. %, preferably a maximum of 40 wt. % and particularly preferably a maximum of 30 wt. %, based on the total formulation. The further constituents are preferably crystalline or partly crystalline polyolefins, which include in particular isotactic polypropylene, syndiotactic polypropylene, polyethylene (HDPE, LDPE and/or LLDPE), isotactic poly(1-butene), syndiotactic poly(1-butene), copolymers thereof and/or copolymers thereof with linear and/or branched 1-olefins having 5 to 10 carbon atoms. It is furthermore preferable for the crystalline or partly crystalline polyolefins to be chemically modified polyolefins, the chemical modification including in particular such modification by maleic anhydride, itaconic anhydride, acrylic acid, acrylates, methacrylates, unsaturated epoxy compounds, silane acrylates, silanes and hydroxyalkylsilanes.

The further constituents can furthermore include polymers with polar groups. Polymers with polar groups include polystyrene copolymers (e.g. with maleic anhydride, acrylonitrile etc.), polyacrylates, polymethacrylates, (co)polyesters, polyurethanes, (co)polyamides, polyether ketones, polyacrylic acid, polycarbonates and chemically modified polyolefins (such as e.g. poly(propylene-graft-maleic anhydride) or poly(propylene-graft-alkoxyvinylsilane). In this context, the mixing of the polymers according to the invention with the polymers containing polar groups can lead to an immediate and/or time-delayed reactive binding of the polymer chains, which preferably leads to an improved compatibility occurring between the two polymer phases, which can be seen, for example, in a shift of the glass transition temperatures of the polymers used. Particularly preferably, the reactive binding leads to the polymer phases showing a common glass transition temperature, that is to say a macroscopic miscibility.

The further constituents can furthermore include homo- and/or copolymers (or also oligomers) based on ethylene, propylene, butadiene, styrene and/or acrylonitrile, which can include as further comonomers a diene and/or a cyclic diene, butadiene, styrene and/or isoprene, and in particular these polymers are block copolymers, in particular rubbers, such as e.g. natural and synthetic rubber, poly(butadiene), poly(isoprene), styrene-butadiene rubber, styrene-isoprene rubber and nitrile rubber. The content of polymers based on butadiene, styrene and/or isoprene is a maximum of 20 wt. %, preferably 1 to 15 wt. %, particularly preferably 1.5 to 10 wt. % and in particular 2 to 9 wt. %, based on the hot melt adhesive formulations. Oligomers are preferably butadiene oligomers.

The further constituents can furthermore be elastomeric polymers based on ethylene, propylene, a diene and/or cis, cis-1,5-cyclooctadiene, exo-dicyclopentadiene, endo-dicyclopentadiene, 1,4-hexadiene and 5-ethylidene-2-norbornene, and in particular these are ethylene-propylene rubber, EPM (free from double bonds, ethylene content 40 to 75 wt. %) and/or EPDM. The content of polymers based on ethylene, propylene, a diene and/or cis,cis-1,5-cyclooctadiene, exo-dicyclopentadiene, endo-dicyclopentadiene, 1,4-hexadiene and 5-ethylidene-2-norbornene is conventionally a maximum of 20 wt. %, preferably 1 to 15 wt. %, particularly preferably 1,5 to 10 wt. % and in particular 2 to 9 wt. %, based on the hot melt adhesive formulations.

Alternatively, the further constituents can include waxes, in particular modified and non-modified waxes, these preferably being crystalline, partly crystalline and/or amorphous polyolefin waxes based on polyethylene, polypropylene and/or poly(1-butene), paraffin waxes, metallocene waxes, microwaxes, polyamide waxes, polytetrafluoroethylene waxes and/or Fischer-Tropsch waxes. The content of waxes is a maximum of 50 wt. %, preferably 1 to 40 wt. %, particularly preferably 2 to 30 wt. % and especially preferably 3 to 20 wt. %, based on the hot melt adhesive formulations.

The further constituents can furthermore include fillers, the fillers being employed in order to adapt the specific profiles of properties of the adhesive layer, such as e.g. the temperature use range, the strength, the shrinkage, the electrical conductivity, the magnetism and/or the thermal conductivity, to specific requirements in a targeted manner. The fillers are generally inorganic and/or organic fillers. The inorganic fillers are chosen in particular from silicas (incl. hydrophobized silicas), quartz flour, chalks, titanium dioxide, zinc oxide, zirconium oxide (the last three preferably in nanoscale form), barite, glass particles (in particular spherical particles to increase the reflection of light), glass fibers, carbon fibers, asbestos particles, asbestos fibers and/or metal powders. Organic fillers are, for example, carbon black, bitumen, crosslinked polyethylene, crosslinked non-vulcanized or vulcanized rubber mixtures, synthetic fibers, such as e.g. polyethylene fibers, polypropylene fibers, polyester fibers, polyamide fibers, aramid fibers, saran fibers, MP fibers or natural fibers, such as straw, wood, wool, cotton, silk, flax, hemp, jute and/or sisal. The content of fillers is a maximum of 80 wt. %, preferably 1 to 60 wt. %, particularly preferably 5 to 40 wt. % and especially preferably 7 to 30 wt. %, based on the hot melt adhesive formulations.

The further constituents can likewise include crosslinking accelerators. This is particularly preferable if the polymers according to the invention are employed in a bond which is to achieve its maximum load a short time after the joining. Suitable crosslinking accelerators are a large number of chemical compounds, in particular Brönstedt and/or Lewis acids, such as e.g. acetic acid, itaconic acid, zinc(II) acetate, cadmium acetate, zinc oxide, zinc stearate, zinc(II) chloride, tin(IV) chloride, dibutyltin oxide, dibutyltin dilaurate, bismuth citrate, bismuth(III) oxide, bismuth titanate, tetrabutylgermanium, tetrabutyltin titanium boride, titanium(IV) oxide, titanium acetylacetonate, tributyl titanate, sodium chloride, magnesium(II) chloride, zinc acetylacetonate, zinc methacrylate, zinc niobate, tin(II) oxide, tin(IV) oxide, zirconium(IV) acetylacetonate, zirconium(IV) oxide and/or zirconium(V) silicate.

The further constituents can likewise include stabilizers, these being employed in order to protect the adhesive formulation from external influences, such as e.g. the influence of (processing) heat, exposure to shearing forces, sunlight, atmospheric humidity and oxygen. Suitable stabilizers are, for example, hindered amines (HALS stabilizers), hindered phenols, phosphites and/or aromatic amines (such as are commercially obtainable e.g. under the product names IRGANOX, KINOX, DOVERNOX, WESTON, IRGAPHOS, DOVERPHOS and/or IONOL). Particularly preferably, the stabilizers employed according to the invention contain only one hydrolytically active end group per molecule. The content of stabilizers in the formulations mentioned is a maximum of 3 wt. %, preferably between 0.05 and 2.5 wt. % and especially preferably between 0.1 and 2 wt. %, based on the hot melt adhesive formulations. In a particular embodiment, a reactive binding of the stabilizer(s) to the polymer modified according to the invention takes place, as a result of which migration of stabilizer from the adhesive bond is prevented.

The further constituents can moreover include one or more oils, which can be natural and/or synthetic oils. These one or more oils preferably have a viscosity at the processing temperature of from 0.1 to 1,000 mPa*s, preferably from 1 to 750 mPa*s, most preferably from 2 to 500 mPa*s. Suitable oils are, for example, mineral oils, (medicinal) white oils, isobutene oils, butadiene oils, hydrogenated butadiene oils and/or paraffin oils. The content of the one or more oils is a maximum of 50 wt. %, preferably 1 to 45 wt. %, particularly preferably 3 to 40 wt. % and in particular 5 to 38 wt. %, based on the hot melt adhesive formulations.

The hot melt adhesive formulations can furthermore comprise inorganic and/or organic pigments, UV-active substances, organic and/or inorganic nucleating agents which accelerate the crystallization of the polymers and therefore reduce the open time ("open time"=time span in which the parts to be bonded can be joined to one another) of the bond.

In a further preferred form of the hot melt adhesive formulations according to the invention, the formulations described above are multiphase blends.

The present invention also provides bonds comprising one or more modified polyolefins of the present invention. In particular, the bonds are packaging bonds, bonds on hygiene articles, wood bonds, bonds and/or seals on glass surfaces, label bonds, laminating bonds, carpet or artificial lawn bonds, shoe bonds, pressure-sensitive bonds, book bonds or textile bonds.

It is particularly characteristic of the present invention that when the modified polyolefins according to the invention are used for bonds to or on polyolefin surfaces and/or glass surfaces, an energy and/or chemical pretreatment of the polyolefin surfaces and/or glass surfaces, e.g. by flame treatment, plasma treatment, corona treatment, sulphonation, etching, application of primer etc., can be omitted and a very good adhesion to these surfaces is nevertheless achieved.

In the case of packaging bonds, the packaging materials can include the materials wood, card, paper, plastic, metal, ceramic, glass, synthetic and/or natural fibers and/or textiles. The packaging materials are preferably non-polar plastics, in particular polyethylene, polypropylene, poly(1-butene) or their copolymers with linear and/or branched $C_{2-20}$ 1-olefins, for example non-crosslinked polyethylene, such as e.g. LDPE, LLDPE and/or HDPE, and/or (e.g. silane-) crosslinked polyolefin, in particular silane-crosslinked polyethylene. The non-polar plastics can furthermore be, in particular, polystyrene, polybutadiene or polyisoprene homo- and/or copolymers and/or their copolymers with linear and/or branched $C_{2-20}$ 1-olefins or dienes, such as e.g. EPDM, EPM or EPR, and/or synthetic or natural rubber.

The modified polymers according to the invention are distinguished in that after a storage time of at least 14 days in a climatically controlled cabinet (20° C./65% relative atmospheric humidity) in a pure polypropylene bond (material: non-treated isotactic polypropylene), they have (without further additives) an adhesive shear strength of at least 1.25 N/mm², preferably of at least 1.5 N/mm², particularly preferably of at least 1.75 N/mm² and especially preferably of at least 2.0 N/mm². After a storage time of 42 days (without further additives), adhesive shear strengths on non-treated polypropylene of at least 1.75 N/mm², preferably at least 2.0 N/mm², and especially preferably of at least 2.25 N/mm² are achieved.

In the case of polar plastics, these are, in particular, polyacrylates, in particular polyalkyl methacrylates, polyvinyl acetate, polyesters and/or copolyesters, in particular polyethylene therephthalate and/or polybutylene terephthalate, polyamides and/or copolyamides, acrylonitrile copolymers, in particular acylnitrile/butadiene/styrene copolymers and/or styrene/acrylonitrile copolymers, maleic anhydride copolymers, in particular S/MAA copolymers and/or MAA-grafted polyolefins, such as e.g. polypropylene and/or polyethylene, polyvinyl chloride and/or polycarbonates.

Generally, the packaging materials can be in the form of a carton, box, container, sheet, disc, film and/or foil. For example, corresponding films of plastic can be produced via extrusion, calendering, blow molding, casting, drawing from solution, thermoforming or a combination of several of these techniques. For example, the films of plastic are single-layer films which are orientated or are not orientated. In the case of orientation of the single-layer film, a mono-, bi- or multiaxial orientation can exist, it being possible for the orientation axes to be at any desired angle to the film take-off direction.

Alternatively, the films of plastic can be multi-layered films, it being possible for the layers of film to be produced either from the same or from a different material. The modified polymers according to the invention are suitable in particular for improving the adhesion to polyolefin films. In this context, both improvement of the adhesion between two polyolefin layers and improvement of the adhesion of the top polyolefin layer (e.g. for a coating/lacquering etc.) by the modified polymers according to the invention is possible in particular. Multi-layered films can be orientated or non-orientated. In the case of orientation of the multilayered films of plastic, a mono-, bi- or multiaxial orientation can exist, it being possible for the orientation axes to be at any desired angle to the film take-off direction. In a particular embodiment, the multi-layered film of plastic is a composite film. The modified polymers according to the invention are outstandingly suitable in this context for establishing and/or improving the adhesion between the polymer film and composite material. In particular, outstanding adhesion properties are to be realized with polyolefin-aluminum, polyolefin-glass, polyolefin-paper/card and polyolefin/natural fiber composites. In the bonding of composite films, one or more of the film layers can be made of composite material, it being possible for the composite materials to be in a continuous form (e.g. paper, aluminum foil and the like) and/or discontinuous form (e.g. particles and/or fibers).

In particular, in the bonding according to the present invention of packaging materials of plastic, as a rule no chemical and/or energy pretreatments of the surfaces of the plastic (e.g. plasma, corona treatment, etching, sulphonation etc.) is necessary to achieve an adhesion.

In the case of bonds on wood packaging materials, the wood packaging can be solid genuine wood, genuine wood laminates, laminates of plastic, MDF boards and/or similar wood-like substances. In this context, both low-resin or -oil woods, such as e.g. beech, oak etc., and resin- or oil-rich woods, such as teak, pine etc., can be used. In particular, bonds are not significantly weakened by diffusion of oils and/or resins or constituents thereof out of the wood at the adhesive interface to the polymer according to the invention, that is to say they still have high adhesive shear values even after a long storage time. Due to the natural moisture contained in most of the usual types of wood, a rapid and complete crosslinking of the adhesive layer is achieved (depending on the thickness of the adhesive layer), which leads to particularly high adhesive shear strengths in wood bonds using the polymers according to the invention.

There are in principle no limitations to the bonds on hygiene articles, for example these can be nappies, sanitary towels, inlays etc. As a rule, a multi-layered structure which includes various materials, such as e.g. polymer films and nonwovens, is built up by the bond according to the invention. The bond can moreover comprise moisture-absorbing substances, such as e.g. polyacrylic acid particles (in particular non-crosslinked or partly crosslinked), which can also be bound reactively to the adhesive layer by the modified polyolefins according to the invention, and the modified polyolefins according to the invention are also suitable in particular as a matrix and/or substrate material for absorber layers.

A further field of use of the bonds according to the invention are structure wood bonds, in particular edging strips and/or decorative paper sheathings and/or decorative film laminations and/or assembly bonds (e.g. in furniture construction). In this context, by the crosslinking of the polymers according to the invention, in contrast to non-modified polyolefins, such bonds which must withstand exposure to high temperatures (e.g. laminated work surfaces in the kitchen sector) are also possible. In the case of wood bonds, the wood used can be solid genuine wood, genuine wood laminates, laminates of plastic, MDF boards and/or similar wood-like substances. In this context, both low-resin or -oil woods, such as e.g. beech, oak etc., and resin- or oil-rich woods, such as teak, pine etc., can be used. In particular, bonds are not significantly weakened by diffusion of oils and/or resins or constituents thereof out of the wood at the adhesive interface to the polymer according to the invention, that is to say they still have high adhesive shear values even after a long storage time. Due to the moisture naturally present in wood, a particularly complete crosslinking is achieved in bonds involving wood, which leads to extremely resistance bonds.

The modified polymers according to the invention are distinguished in that in a pure wood bond (wood type: non-treated beech), after at least 14 days of storage in a climatically controlled cabinet (20° C./65% relative atmospheric humidity) they have (without further additives) an adhesive shear strength of at least 1.5 N/mm$^2$, preferably of at least 2.0 N/mm$^2$, particularly preferably of at least 2.5 N/mm$^2$ and especially preferably of at least 3.0 N/mm$^2$. After a storage time of 42 days (without further additives), adhesive shear strengths on non-treated wood test specimens (beech) of at least 2.5 N/mm$^2$, preferably at least 3.5 N/mm$^2$, particularly preferably of at least 3.75 N/mm$^2$ and especially preferably of at least 4 N/mm$^2$ are achieved.

A further essential field of use of the bonds according to the invention are bonds involving a glass surface. In this context, the bond can comprise moisture-absorbing substances, such as e.g. silica gel, molecular sieve, polyacrylic acid particles etc. A laminated insulating glass is preferred here. All types of laminated insulating glasses known to the person skilled in the art are suitable for this, regardless of the individual structure, for example with or without further spacers.

Lamination can furthermore be carried out with bonds according to the invention involving a glass surface.

The glass surface can moreover be the surface of glass fibers, for example the surface of a glass fiber cable such as is used e.g. for data and/or telephone lines.

Because of their plastic deformability in the non-crosslinked state, the modified polyolefins according to the invention can be particularly readily employed in or as sealing compositions, in particular in such sealing compositions which are applied completely or partly to a glass surface.

In a further embodiment of the present invention, the object to be bonded is a label. The label here can be made of a film of paper, plastic or metal and/or a multi-layered film, and can be used in particular for labeling metal cans, in particular tinplate cans, which have been lacquered, coated, anodized and/or surface-treated in another manner, and bottles of glass or plastic (in particular PET). In particular, the adhesive for label bonds can be a so-called "pressure-sensitive" adhesive (PA).

In a further embodiment of the present invention, the bonds are a lamination, it being possible for the surface to be laminated to be the surface of an inorganic and/or organic substance, preferably of metals (e.g. steel, aluminum, brass, copper, tin, zinc, enamel), of glass, of ceramics and/or inorganic building materials, such as e.g. open- or closed-pored concrete. The surface can moreover be wood, paper, card and/or plastics. The surface can itself be a composite material of inorganic and organic materials (e.g. glass fiber composite materials). In this context, the counter-laminated laminating material can be inorganic and/or organic in nature. Examples of counter-laminated inorganic laminating materials are ultra-thin panes of glass, ceramic membranes and/or metal foils (e.g. aluminum foil). Corresponding examples of counter-laminated organic laminating materials are paper, card, wood veneer, plastics (e.g. as a film of plastic), natural and/or synthetic textiles, nonwovens, artificial leather and/or natural leather.

In particular, the bonds according to the invention are bonds in motor vehicle interiors (e.g. screens, sunroof, luggage space cover, interior lining etc.)

In a further particular embodiment of the present invention, the bonds are bonds for the production of carpets and/or artificial lawns. In particular, the bond is employed for binding in tufts and filaments. In this context, the fibers or composite fibers to be bound in can be natural and/or synthetic fibers. Examples of natural fibers and composite fibers are wool, cotton, sisal, jute, straw, hemp, flax, silk and/or mixtures of these fibers.

Examples of synthetic fibers or composite fibers to be bound in are (co)polyamide fibers, polyethylene fibers, (co)polyester fibers, polypropylene fibers and/or mixtures of these fibers. In the case of artificial lawn bonds, the filaments bound in by the bond are preferably chosen from polypropylene filaments, polyethylene filaments, polyamide filaments, polyester filaments or mixed filaments of the plastics listed. Polyethylene and/or polypropylene filaments are particularly preferred. In the field of bonding of artificial lawns, the good adhesion of the modified polyolefins according to the invention to non-treated polyethylene and/or propylene together with a high resistance to tearing out of the filaments (also when low weights are applied) and a high flexibility both of the non-crosslinked and of the crosslinked polymers is to be mentioned as a particular advantage.

Preferably, the bond is employed for coating the carpet back. A textile substrate can moreover additionally be counter-laminated.

The carpet elements obtained are, for example, so-called meter goods, carpet tiles or a subsequently deformable automobile carpet. In the uses mentioned for binding in tufts and filaments, the modified polyolefin according to the invention contained in the bond has a melt viscosity at 190° C. of a maximum of 10,000 mPa*s, preferably of a maximum of 8,000 mPa*s, particularly preferably from 1,000 to 7,000 mPa*s and especially preferably from 1,250 to 6,500 mPa*s. The weight applied is, in particular, 20 to 1,500 g/m². The application of the hot melt adhesive composition in this context can preferably be in the form of spray, doctor blade and/or roller or roll application. Further examples lie within the expertise of a person skilled in the art.

The bonds according to the invention can furthermore be shoe bonds, which can be employed, for example, in the field of sports shoes and/or for the production of so-called split leather.

So-called "pressure-sensitive bonds" (PSA) are likewise bonds according to the invention. It is advantageous here if at least one of the polymers and/or formulation constituents contained in the bond has a "cold flow" (that is to say no melting point or a melting point below room temperature). Formulation constituents with cold flow are, for example, poly(1-hexene), poly(1-octene), poly(1-hexene-co-1-octene), polyacrylates etc. By the crosslinking of the modified polyolefins according to the invention within the corresponding pressure-sensitive adhesive formulations, particularly elastic adhesive joins are produced.

In the case of book bonds, these are as a rule bonding carried out during the book-binding operation.

In textile bonds, several textile layers can be joined to one another at points or over an area, it being possible for the textile elements to be bonded to include natural or synthetic materials. In particular, the natural textile elements are wool, horsehair, cotton, linen fabric, hemp, jute, sisal, flax, straw and/or leather. Preferred synthetic textile elements contain as constituents polypropylene, polyethylene, (co)polyamides, (co)polyesters, nylon, perlon and/or Keflar®. In particular, one or more of the elements to be bonded can be a structural inlay. In a particular embodiment, the adhesive formulation according to the invention is introduced in the form of a powder between the textile layers to be bonded and is activated by thermal energy (e.g. with the aid of an ironing press).

In an embodiment of the present invention which is likewise according to the invention, the modified polyolefins according to the invention are employed in marking compositions, coating compositions, sealing sheets or roofing felts.

The marking compositions according to the invention can comprise the further constituents already mentioned in the description of the molding compositions or adhesive formulations. For example, the marking compositions according to the invention can be employed as road marking compositions.

In the case of coating compositions, these can be, for example, a coating composition for coating card or paper, and a coating of a composite material which comprises card or paper, which can also comprise as further components of the material metal foils/metallic layers (e.g. based on aluminum) and/or films of plastic.

The polymers according to the invention are furthermore suitable for use in sealing sheets. In addition to the polymers according to the invention, the sealing sheets can contain further constituents, and the further constituents are, in particular, other polymers, fillers and bitumen. In the case of the sealing sheets, the content of the modified polymers according to the invention is a maximum of 30 wt. %, preferably a maximum of 27 wt. %, particularly preferably a maximum of 25 wt. % and especially preferably a maximum of 22 wt. %, based on the sealing sheet. In particular, the sealing sheets are roofing felts.

The modified polyolefins according to the invention are furthermore suitable for use as primers, adhesion promoters or in primer formulations and/or adhesion promoter formulations, the absence of halogenated organic constituents being an advantage in particular. In particular, primer and adhesion promoter formulations which comprise the polymers according to the invention are employed in order to achieve an adhesion of organic coatings and/or adhesives to non-treated polyolefin surfaces, in particular to non-treated polyethylene and/or polypropylene, and to glass surfaces. In a specific case, the primer and/or adhesion promoter formulations are used as a primer coat on polypropylene moldings, such as e.g. motor vehicle bumpers as lining parts, in order to achieve a better adhesion of the subsequent lacquering.

The primers and primer formulations according to the invention can comprise further constituents in addition to the modified polyolefins according to the invention. In particular, the primers/primer formulations which are liquid at room temperature can comprise cyclic and/or linear aliphatic and/or aromatic hydrocarbons with or without hetero atoms, and the use of the also corresponding halogenated hydrocarbons is also possible. Preferably, however, no halogenated hydrocarbons are used. In the primers/primer formulations which are liquid at room temperature, the hydrocarbons mentioned preferably have a content in the formulations of a maximum of 95 wt. %, preferably a maximum of 93 wt. %, particularly preferably a maximum of 90 wt. % and especially preferably a maximum of 85 wt. %.

The modified polyolefins according to the invention are furthermore suitable for use in dispersions, suspensions and/or emulsions. In the dispersions, suspension and/or emulsions mentioned, the content of polyolefins according to the invention is preferably more than 10 wt. %, based on the total formulation.

The modified polyolefin according to the invention is applied as the pure substance or in the form of the abovementioned formulations (in the case of formulations which are solid at room temperature) to the substrates to be bonded, preferably in the form of a melt at temperatures between 50° C. and 300° C., preferably between 100° C. and 285° C., particularly preferably between 130° C. and 260° C. and especially preferably between 140 and 250° C. During the heating or melting, covering/veiling with inert gas (e.g. nitrogen, argon etc.) is advisable in order to prevent the formation of gel particles on the surface. The most diverse application techniques can be used for this, such as e.g. roll or roller application, sheet die, doctor blade application, spot application, multiline application, Rototherm application, spray application in the swirling process or over a wide area with melt blow or air-assisted spray processes. If the modified polymers according to the invention are used in spray application, the use of inert gases (e.g. nitrogen, argon etc.) as the spray medium is preferred in particular. The substrates are then joined together within the so-called "open time", the duration of which depends on the composition of the mixture applied. If the adhesive applied is held at the application temperature by preheated substrates, rolls etc. or radiation, a longer time is of course available for joining the substrates together.

The crosslinking of the system takes place by means of water; depending on the requirements of the user and the properties of the substrate, this is effected by means of water vapor from the ambient air, by steam or hot water treatment or by water which is contained in the formulation constituents and/or substrates.

It is assumed that a person skilled in the art can also utilize the above described in its widest scope without further comments. The preferred embodiments and examples are therefore to be interpreted merely as a descriptive disclosure which is in no way limiting in any manner.

The present invention is explained in more detail in the following with the aid of examples. Alternative embodiments of the present invention are obtainable in an analogous manner.

Analysis:

a) High Temperature $^{13}$C-NMR

The polymer composition, the (co)monomer tacticity and the number of monomer blocks are determined via high temperature $^{13}$C-NMR. The $^{13}$C-NMR spectroscopy of polymers is described, for example, in the following publications:

[1] S. Berger, S. Braun, H.-O. Kalinowski, $^{13}$C-NMR-Spektroskopie, Georg Thieme Verlag Stuttgart 1985
[2] A. E. Tonelli, NMR Spectroscopy and Polymer Microstructure, Verlag Chemie Weinheim 1989
[3] J. L. Koenig, Spectroscopy of Polymers, ACS Professional Reference Books, Washington 1992
[4] J. C. Randall, Polymer Sequence Determination, Academic Press, New York 1977
[5] A. Zambelli et al: Macomolecules, 8, 687 (1975)
[6] A. Filho, G.Galland: J.Appl.Polym.Sci., 80, 1880 (2001)

b) Rheology

The rheology measurements are carried out in accordance with ASTM D 4440-01 ("Standard Test Method for Plastics: Dynamic Mechanical Properties Melt Rheology") using an MCR 501 rheometer from Anton Paar with a plate-plate geometry (plate diameter: 50 mm) as an oscillation measurement. 1% is used as the maximum sample deformation in all the measurements, and the temperature-dependent measurements are carried out at a measurement frequency of 1 Hz and a cooling rate of 1.5 K/min.

The maximum deformation of the sample is chosen such that the sample is in the linearly viscoelastic range throughout the entire measurement time. The polymers according to the invention are therefore distinguished inter alia in that their melting shows viscoelastic properties. Viscoelastic materials are distinguished from Hooke solids by the ability to break down, by dissipation over a certain time, stresses resulting from a deformation (relaxation). In contrast to Newtonian liquids, which are subject to an exclusively irreversible deformation under the action of shear/elongation, viscoelastic fluids can regain some of the deformation energy after the shearing force has been removed (so-called "memory effect") [N. P.Cheremisinoff; "An Introduction to Polymer Rheology and Processing"; CRC Press; London; 1993]. A further characteristic of the melting of the polymers according to the invention is the occurrence of a so-called structural viscosity. A property where the shear stress as the force occurring breaks down the starting structure of the material as a function of the shear rate is called structural viscosity. Since a prerequisite of this breakdown process is a minimum shear rate, the material flows like a Newtonian liquid below this shear rate. The Le Chatelier principle delivers an explanation, the "escape" of the liquid with structural viscosity (before the mechanical stress) consisting of alignment along the stress areas to reduce the frictional resistance. The latter leads to breakdown of the equilibrium structure of the initial state and to breakdown of a shear-orientated structure, which in turn results in a facilitated flow (reduction in viscosity). In polymer melts, the Newtonian region is perceptible only at very low shear rates or low shear amplitudes. Its determination is possible via rheometric test methods (amplitude "sweeps", i.e. measurement at a fixed frequency as a function of the shear amplitude) and is necessary if the measurement is to be carried out in the reversible, i.e. reproducible range [R. S. Lenk; "Rheologie der Kunststoffe"; C.Hanser Verlag; Munich; 1971; J. Meissner; "Rheologisches Verhalten von Kunststoff-Schmelzen und-Lösungen" in: "Praktische Rheologie der Kunststoffe"; VDI-Verlag; Düsseldorf; 1978; J. -F. Jansson; Proc.8th.Int.Congr.Rheol.; 1980; vol.3]. Because of its low force effect, its low deformation and therefore the low effect on the sample morphology, oscillation rheometry is particularly well-suited to analysis of materials which show structural viscosity properties. In the present case, the modified polymers are always measured without further additives in the non-crosslinked state, veiling with dry protective or inert gas (e.g. nitrogen, argon etc.) expediently taking place during the measurement. Due to the crosslinking of the modified polyolefins according to the invention, a build up in molecular weight (viewed per molecule) occurs, which results in an increase in the melt viscosity. The degree of the increase in this context depends inter alia on the monomer used, the thickness of the test specimen, the concentration of crosslinking accelerator and the degree of grafting (i.e. the amount of grafted-on moisture-crosslinking groups). Completely crosslinked polymers modified according to the invention which have a high degree of grafting melt only at very high temperatures or not at all, and have a certain degree of rubber elasticity (i.e. the storage modulus lies in a very wide temperature range considerably above the loss modulus).

c) Needle Penetration (PEN)

The needle penetration is determined in accordance with DIN EN 1426. In the present case, the modified polymers are always measured without further additives in the non-crosslinked state, veiling with dry protective or inert gas (e.g. nitrogen, argon etc.) expediently taking place during the measurement. Due to the crosslinking of the polyolefins according to the invention, a linking occurs between the polymer molecules, which has the effect of changing the material properties, such as e.g. also the needle penetration. The extent of the increase in this context depends inter alia on the monomer used, the concentration of crosslinking accelerator and the degree of grafting (i.e. the amount of grafted-on moisture-crosslinking groups). In this context, the needle penetration as a rule drops with increasing progress of the crosslinking.

d) DSC

The determination of the melt enthalpy, the glass transition temperature and the melting range of the crystalline content is carried out via differential scanning calorimetry (DSC) in accordance with DIN 53 765 from the 2nd heating curve at a heating rate of 10 K/min. The point of inflection of the heat flow curve is evaluated as the glass transition temperature. In the present case, the modified polymers are always measured without further additives in the non-crosslinked state, veiling with dry protective or inert gas (e.g. nitrogen, argon etc.) expediently taking place during the measurement. Due to the crosslinking of the polyolefins according to the invention, a linking occurs between the polymer molecules, which has the effect of changing the material properties, such as e.g. also the glass transition temperature, the melting point(s) and the melt enthalpy. The extent of the change in this context depends inter alia on the monomer used, the sample thickness, the concentration of crosslinking accelerator and the degree of grafting (i.e. the amount of grafted-on moisture-crosslinking groups). In general, with increasing crosslinking an increasing glass transition temperature, an increasing melting point and a decreasing enthalpy is to be assumed for the modified polyolefins according to the invention. Completely crosslinked polymers modified according to the invention which have a high degree of grafting melt only at very high temperatures or not at all, and compared with non-crosslinked modified and also non-modified polyolefins according to the invention have only a very weakly pronounced—or no—glass transition and only a very much lower—or no—melt enthalpy.

e) Tensile Strength and Elongation at Break

The determination of the tensile strength and elongation at break is carried out in accordance with DIN EN ISO 527-3. Due to the crosslinking of the polyolefins according to the invention, a linking occurs between the polymer molecules, which has the effect of changing the material properties, such as e.g. also the tensile strength and the elongation at break. The extent of the change in this context depends inter alia on the monomer used, the sample thickness, the concentration of crosslinking accelerator and the degree of grafting (i.e. the amount of grafted-on moisture-crosslinking groups). As a rule, in the modified polyolefins according to the invention, as the crosslinking increases the tensile strength increases. The elongation at break can in principle either increase with increasing crosslinking or also fall, depending on the grafting monomer used and the reaction conditions used.

f) Softening Point (Ring and Ball)

The determination of the softening point by the ring and ball method is carried out in accordance with DIN EN 1427. In the present case, the modified polymers are always measured without further additives in the non-crosslinked state, veiling with dry protective or inert gas (e.g. nitrogen, argon etc.) expediently taking place during the measurement. Due to the crosslinking of the polyolefins according to the invention, a linking occurs between the polymer molecules, which has the effect of changing the material properties, such as e.g. also the softening temperature. The extent of the change in this context depends inter alia on the grafting monomer(s) used, the sample thickness, the concentration of crosslinking accelerator and the degree of grafting (i.e. the amount of grafted-on moisture-crosslinking groups). As a rule, in the modified polyolefins according to the invention, as the crosslinking increases the softening point increases. Completely crosslinked polymers modified according to the invention which have a high degree of grafting soften only at very high temperatures or not at all (according to the definition).

g) Adhesive Shear Strength

The determination of the adhesive shear strength is carried out in accordance with DIN EN 1465. All the test specimens used are cleaned and freed from dust before preparation of the specimens. All the test specimens of plastic are additionally degreased with a suitable cleaning composition before preparation of the specimens. All the cleaned, de-dusted and degreased test specimens are stored in a climatically controlled cabinet at 20° C. and 20% rel. atmospheric humidity before use. A uniform water content e.g. in the case of wood test specimens is thereby achieved. Singular effects caused by an increased humidity, e.g. in the case of hydrophilic or hydrolysis-sensitive polymers, are ruled out or minimized in this way. Due to the crosslinking of the polyolefins according to the invention, a linking occurs between the polymer molecules, which may have the effect of changing the material properties, such as e.g. also the adhesive shear strength. This applies above all in the case where a cohesive fraction (material failure within the adhesive layer) has been found in the testing of the adhesive shear strength in the non-crosslinked state. The extent of the change in this context depends inter alia on the grafting monomer(s) used, the thickness of the adhesive layer, the concentration of crosslinking accelerator and the degree of grafting (i.e. the amount of grafted-on moisture-crosslinking groups). As a rule, in the modified polyolefins according to the invention, as the crosslinking increases the adhesive shear strength increases, since on the one hand a reactive binding to the specimen surface (improved adhesion) and on the other hand a build up in molecular weight (improved cohesion) takes place.

h) RFA Spectroscopy

The specimens poured into alu dishes and cured are stamped out with a stamping iron (diameter 30 mm). The determination is carried out as a duplicate determination. The layer thickness of the polymer specimens is >5 mm. The specimens are placed in the specimen holder and measured (measuring apparatus: PANalytical PW 2404). The quantitative determination is carried out against an external calibration of Si in borax tables.

i) Solubility in Xylene

A xylene isomer mixture is used, the polymer being dissolved under reflux and the solution then being cooled to room temperature.

2 g of polyolefin are dissolved in 250 ml of xylene, while stirring and heating to the boiling point of xylene. After the polymer solution has been boiled under reflux for 20 min, it is allowed to cool to 25° C. Undissolved or precipitated polyolefin is filtered off (15 cm suction filter, Sartorius 390 filter paper) and dried. The polymer solution which remains is precipitated in a 5-fold excess of methanol (to which one drop of 37 per cent strength aqueous HCl has been added). The precipitate formed is filtered off and dried in a drying cabinet at 80° C. (vacuum). In the present case, the modified polymers are expediently measured without further additives in the non-crosslinked state, storage of the modified polymers used for the solution tests likewise expediently taking place under dry protective/inert gas. Due to the crosslinking of the polyolefins according to the invention, a linking occurs between the polymer molecules, which has the effect of changing the material properties, such as e.g. also the solubility. The extent of the change in this context depends inter alia on the grafting monomer(s) used, the thickness of the polymer particles used for the solution tests, the concentration of crosslinking accelerator and the degree of grafting (i.e. the amount of grafted-on moisture-crosslinking groups). As a rule, in the modified polyolefins according to the invention, as the crosslinking increases the solubility drops markedly. In the case of completely crosslinked modified polymers according to the invention which have a high degree of grafting, as a rule less a solubility than rather a certain swelling capacity is observed.

j) Solubility in THF

The solubility in THF is a characteristic of partly crystalline polyolefins. The tests are carried out analogously to the solution tests in xylene. That said for xylene with respect to the influence of the crosslinking also applies at least gradually for THF.

In this context, the measurement methods described relate to any measurement in the context of the present invention, regardless of whether it is a matter of the base polymer to be grafted or the polyolefin according to the invention.

EXAMPLES

Base Polymers According to the Invention and Comparison Examples Which are Not According to the Invention The base polymers (Ex. no. 3-6 according to the invention) are prepared using a mixed contact of a crystalline titanium trichloride in the form of an aluminium-reduced $TiCl_4$ ($TiCl_3*0.33\ AlCl_3$) and aluminumtriisobutyl (in the weight ratio of 1:4). The monomers shown in Table 1 are polymerized in the solvent n-butane at 70° C. in a laboratory autoclave, varying amounts of hydrogen be employed as a molecular weight regulator, depending on the target molecular weight. Pressures of from 10 to 36 bar arise. The monomers ethene and propene are metered in continuously during the reaction time of 3 h, and the monomer 1-butene is initially introduced together with the solvent used. After 3 h, isopropanol is added to the reaction mixture, as a result of which the reaction is stopped. Unreacted monomers and the solvent n-butane are evaporated in an evaporator. The polymer is melted and transferred to a container at a temperature of 190° C.

TABLE 1

|  | Ex. 1 (not according to the invention) (DE 4000695, Ex. 3) | Ex. 2 (not according to the invention) (WO 8911513) | Ex. 3 (according to the invention) |
|---|---|---|---|
| $C_2$ [wt. %] | 6 | 8.5 | 5 |
| $C_3$ [wt. %] | 64 | 65.5 | 62 |
| $C_4$ [wt. %] | 30 | 26 | 33 |
| $C_2$-triads [wt. %] | 2.7 | 2.0 | 2.0 |
| $\Delta H_M$ [J/g] | 7.7 | 6.5 | 12.8 |
| Solubility in xylene [wt. %] | 98 | 92 | 98 |
| Solubility in THF [wt. %] | 99 | 65.5 | 99.7 |
| $\eta_{190°\,C.}$ [mPa*s] | 50,000 | 28,000 | 158,000 |
| PEN [0.1 mm] | 14 | 24 | 14 |
| $T_{soft.}$ [° C.] | 107 | 164 | 108 |
| Tg [° C.] | −30 | −32 | −29 |

TABLE 1-continued

|  | Ex. 4 (according to the invention) | Ex. 5 (according to the invention) | Ex. 6 (according to the invention) |
|---|---|---|---|
| $C_2$ [wt. %] | 13 | 8 | 16 |
| $C_3$ [wt. %] | 70 | 72 | 84 |
| $C_4$ [wt. %] | 17 | 20 | 0 |
| $C_2$-triads [wt. %] | 2.5 | 1.7 | 2.4 |
| $\Delta H_M$ [J/g] | 10.4 | 14.3 | 18.7 |
| Solubility in xylene [wt. %] | 97 | 96 | 99 |
| Solubility in THF [wt. %] | 98 | 78 | 99 |
| $\eta_{190°\,C.}$ [mPa*s] | 500,000 | 330,000 | 68,000 |
| PEN [0.1 mm] | 20 | 17 | 25 |
| $T_{soft.}$ [° C.] | 128 | 113 | 102 |
| Tg [° C.] | −32 | −33 | −39 |

2. Modified Polymers According to the Invention:

Preparation of the modified polyolefins according to the invention in the melt:

A partly crystalline polyolefin (for the composition and material parameters see Table 1) is mixed in a twin-screw extruder (Berstorff ZE40) with the monomer vinyltrimethoxysilane and the initiator dicumyl peroxide (for the amount see Table 2) at a certain reaction temperature (see Table 2) for approx. 90 seconds (DT). The excess monomer is evaporated in the last zone of the extruder under a vacuum of approx. 20 mbar. Stabilization by approx. 0.3 wt. % of IRGANOX 1076 is then carried out.

TABLE 2

|  | Ex. 7 (not according to the invention) (DE 4000695, Ex. 3) | Ex. 8 (not according to the invention) (WO 8911513) | Ex. 9 (according to the invention) |
|---|---|---|---|
| Base polymer acc. to Example | 1 | 2 | 3 |
| Base polymer in the extruder feed [wt. %] | 92.9 | 92.9 | 87.2 |
| Vinyltrimethoxysilane in the extruder feed [wt. %] | 6.0 | 6.0 | 11.1 |
| Dicumyl peroxide in the extruder feed [wt. %] | 1.1 | 1.1 | 1.7 |
| Reaction temperature [° C.] | 160 | 180 | 170 |
| $\eta_{190°\,C.}$ [mPa*s] | 6,000 | 10,000 | 3,300 |
| PEN [0.1 mm] | 15 | 24 | 22 |
| $T_{soft.}$ [° C.] | 98 | 158 | 91 |
| Si [wt. %] | 0.32 | 0.32 | 0.75 |
| Tensile strength "0" [MPa] * | 1.3 | 0.75 | 1.0 |
| Tensile strength "40" [MPa] ** | 3.25 | 2 | 4.5 |
| Elongation at break "0" [%] * | 650 | 150 | 200 |
| Elongation at break "40" [%] ** | 800 | 325 | 410 |

|  | Ex. 10 (according to the invention) | Ex. 11 (according to the invention) | Ex. 12 (according to the invention) |
|---|---|---|---|
| Base polymer acc. to Example | 3 | 3 | 3 |
| Base polymer in the extruder feed [wt. %] | 92.4 | 87.95 | 86.3 |
| Vinyltrimethoxysilane in the extruder feed [wt. %] | 7.1 | 11 | 12.95 |
| Dicumyl peroxide in the extruder feed [wt. %] | 0.5 | 1.05 | 0.75 |
| Reaction temperature [° C.] | 165 | 200 | 170 |
| $\eta_{190°\,C.}$ [mPa*s] | 13,300 | 18,000 | 27,500 |
| PEN [0.1 mm] | 15 | 14 | 13 |
| $T_{soft.}$ [° C.] | 98 | 99 | 101 |
| Si [wt. %] | 0.50 | 0.45 | 0.35 |
| Tensile strength "0" [MPa] * | 2.0 | 2.45 | 2.75 |
| Tensile strength "40" [MPa] ** | 4.75 | 5 | 5.5 |

TABLE 2-continued

| Elongation at break "0" [%] * | 900 | 1.000 | 1.040 |
| --- | --- | --- | --- |
| Elongation at break "40" [%] ** | 800 | 760 | 830 |

|  | Ex. 13 (according to the invention) | Ex. 14 (according to the invention) | Ex. 15 (according to the invention) | Ex. 16 (according to the invention) |
| --- | --- | --- | --- | --- |
| Base polymer acc. to Example | 3 | 6 | 5 | 4 |
| Base polymer in the extruder feed [wt. %] | 87.25 | 89.4 | 93.75 | 94 |
| Vinyltrimethoxysilane in the extruder feed [wt. %] | 12 | 8.2 | 5 | 5 |
| Dicumyl peroxide in the extruder feed [wt. %] | 0.75 | 1.4 | 1 | 1 |
| Reaction temperature [° C.] | 170 | 165 | 180 | 190 |
| $\eta_{190° C.}$ [mPa*s] | 36,000 | 2,000 | 43,000 | 59,000 |
| PEN [0.1 mm] | 11 | 35 | 12 | 18 |
| $T_{soft.}$ [° C.] | 107 | 90 | 104 | 107 |
| Si [wt. %] | 0.38 | 0.43 | 0.42 | 0.3 |
| Tensile strength "0" [MPa] * | 2.9 | 2.0 | 3.1 | 3.3 |
| Tensile strength "40" [MPa] ** | 4.8 | 3.2 | 5.75 | 6.1 |
| Elongation at break "0" [%] * | 630 | 270 | 980 | 920 |
| Elongation at break "40" [%] ** | 510 | 430 | 760 | 810 |

\* In the non-crosslinked state without storage.
\*\* In the crosslinked state after 40 days of storage (20° C./65% rel. atmospheric humidity).

3. Preparation of the Modified Polyolefins According to the Invention in Solution 150 g of a partly crystalline polyolefin (for the composition and material parameters see Table 1) are dissolved in 750 g of a solvent (for the nature see Table 3) in a laboratory reactor and the solution is brought to a certain reaction temperature (Table 3). 1.85 g of an initiator and 18.75 g of a monomer (for the nature see Table 3) are then metered in continuously for a reaction time of 120 minutes. The metering in is followed by an after-reaction phase of 30 minutes. The solvent and residual monomers are separated off via an evaporator.

4. Bonds Without Further Additives a) Wood Bonds

The polyolefins modified according to the invention are melted at 190° C. in a drying cabinet under an inert gas atmosphere (e.g. nitrogen, argon etc.) for one hour and then applied at a temperature of 170° C. (with the aid of a heat sensor) to a wood test specimen (wood type: solid beech). This is joined together within 20 seconds with a further wood test specimen (wood type: solid beech) with simple overlapping over an area of 4 cm² and the specimens are pressed against one another with a weight of 2 kg for 5 minutes.

TABLE 3

|  | Ex. 17 | Ex. 18 | Ex. 19 | Ex. 20 |
| --- | --- | --- | --- | --- |
| Base polymer acc. to Ex. | 3 | 3 | 4 | 6 |
| Solvent | xylene | xylene | toluene | tetrahydrofuran |
| Monomer | vinyl-triethoxysilane | vinyl-trimethoxysilane | 3-trimethoxy-silylpropyl methacrylate | vinyltris(2-methoxy-ethoxy)silane |
| Initiator | dicumyl peroxide | dicumyl peroxide | dicumyl peroxide | azobis-isobutyronitrile |
| Reaction temp. [° C.] | 130 | 130 | 130 | 85 |
| Note | — | — | — | pressure procedure |
| $\eta_{190° C.}$ [mPa*s] | 41,000 | 18,000 | 56,000 | 49,000 |
| PEN [0.1 mm] | 15 | 17 | 11 | 14 |
| $T_{soft.}$ [° C.] | 104 | 98 | 126 | 107 |
| Si [wt. %] | 0.29 | 0.32 | 0.8 | 0.3 |
| Tensile strength "0" [MPa] * | 2.35 | 2.30 | 2.35 | 2.35 |
| Tensile strength "40" [MPa] ** | 3.05 | 2.95 | 3.80 | 3.75 |
| Elongation at break "0" [%] * | 940 | 720 | 680 | 750 |
| Elongation at break "0" [%] ** | 900 | 860 | 940 | 800 |

\* In the non-crosslinked state without storage.
\*\* In the crosslinked state after 40 days of storage (20° C./65% rel. atmospheric humidity).

Protruding adhesive polymer is removed. The bond sample is then stored for a certain number of days at 20° C./65% rel. atmospheric humidity in a climatically controlled cabinet and is then tested for its mechanical properties by means of tensile testing.

FIG. 1 shows the results with respect to the tensile shear strengths of the systems according to the invention compared with the prior art. Compared with Examples 7 and 8, which are not according to the invention, significantly higher (up to+700%) adhesive shear values are already achieved after significantly shorter storage or crosslinking times, which can be attributed to the significantly better binding to the wood surface and the higher crosslinking density within the adhesive layer.

b) Polypropylene Bonds:

The polyolefins modified according to the invention are melted at 190° C. in a drying cabinet under an inert gas atmosphere (e.g. nitrogen, argon etc.) for one hour and then applied at a temperature of 170° C. (with the aid of a heat sensor) to a polypropylene test specimen (isotactic polypropylene, "PP-DWST"/manufacturer: Simona AG). This is joined together within 20 seconds with a further polypropylene test specimen (isotactic polypropylene, "PP-DWST"/manufacturer: Simona AG) with simple overlapping over an area of 4 cm² and the specimens are pressed against one another with a weight of 2 kg for 5 minutes. Protruding adhesive polymer is removed. The bond sample is then stored for a certain number of days at 20° C./65% atmospheric humidity in a climatically controlled cabinet and is then tested for its mechanical properties by means of tensile testing.

Figure 2:
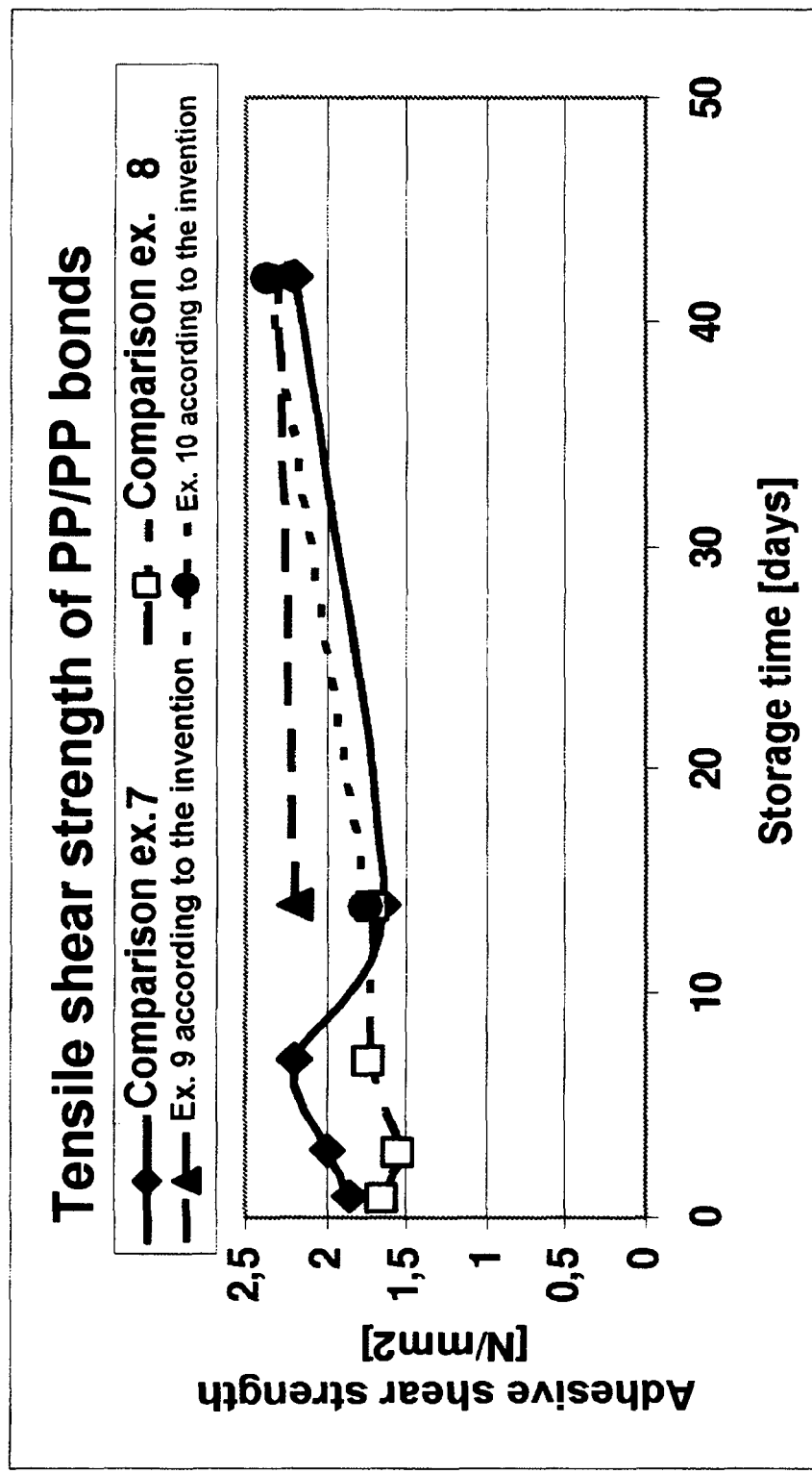

FIG. 2 shows the results with respect to the tensile shear strengths of the systems according to the invention compared with the prior art.

5. Bonds with Crosslinking Catalysts a) Bonds/Coatings of PMMA

In each case 100 g of the polyolefins modified according to the invention are melted in a drying cabinet at 180° C. under an inert gas atmosphere (e.g. nitrogen, argon etc.) for 1 hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a polymethyl methacrylate test specimen (molding composition "7N", Evonik Röhm GmbH). This is joined together within 20 seconds with a further polymethyl methacrylate test specimen (molding composition "7N", Evonik Röhm GmbH) with simple overlapping over an area of 4 cm² and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing.

The following results are achieved at a bonding temperature of 170° C.: Polyolefin modified according to the invention according to Example 9: 0.55 N/mm² Polyolefin modified according to the invention according to Example 10: 0.80 N/mm² After the test, the adhesive film can be peeled off from the PMMA surface without residue.

The following results are achieved at a bonding temperature of 240° C.: Polyolefin modified according to the invention according to Example 9: 0.70 N/mm² Polyolefin modified according to the invention according to Example 10: 1.1 N/mm² After the test, the adhesive film can be peeled off from the PMMA surface without residue.

By increasing the bonding temperature, a significant increase (up to+40%) in the adhesive shear strength can therefore be achieved when the modified polyolefins according to the invention are used, without the PMMA surface thereby being attacked.

b) Bonds on Resin-/Oil-containing Woods

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a wood test specimen test specimen (wood types: pine or teak). This is joined together within 20 seconds with a further wood test specimen in each case of the same wood type (i.e. pine or teak) with simple overlapping over an area of 4 cm² and the specimens are pressed against one another with a weight of 2 kg for 5 minutes. Protruding adhesive polymer is removed. The bond sample is then stored for 14 or 28 days at 20° C./65% rel. atmospheric humidity in a climatically controlled cabinet and is then tested for its mechanical properties by means of tensile testing (see table).

| Modified polyolefin according to the invention according to Example: | Wood type | Adhesive shear strength after 2 weeks storage time [N/mm²] | Adhesive shear strength after 4 weeks storage time [N/mm²] |
|---|---|---|---|
| VESTOPLAST 750[1] (not according to the invention) | pine | 0.65 | 0.65 |
| VESTOPLAST 750[1] (not according to the invention) | teak | 0.70 | 0.52 |
| Ex. 7 (not according to the invention) | teak | 2.50 | 1.86 |
| Ex. 9 according to the invention | pine | 3.70 | 4.9 |
| Ex. 9 according to the invention | teak | 3.10 | 3.0 |
| Ex. 10 according to the invention | pine | 3.61 | 3.75 |
| Ex. 10 according to the invention | teak | 2.95 | 2.90 |

[1]Evonik Degussa GmbH c) Bonds on Polyvinyl Chloride

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a polyvinyl chloride test specimen (Kömadur, manufacturer: Profine GmbH Kömmerling Kunststoffe). This is joined together within 20 seconds with a further polyvinyl chloride test specimen (Kömadur, manufacturer: Profine GmbH Kömmerling Kunststoffe) with simple overlapping over an area of 4 cm$^2$ and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing.

When non-modified VESTOPLAST 750 (not according to the invention, Evonik Degussa GmbH) is used, an adhesive shear strength of 0.62 N/mm$^2$ is measured. When modified polyolefin according to Example 9 (according to the invention) is used, an adhesive shear strength of 1.14 N/mm$^2$ is measured. When modified polyolefin according to Example 10 (according to the invention) is used, an adhesive shear strength of 1.34 N/mm$^2$ is measured.

d) Bonds on Polyethylene

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a polyethylene test specimen ("PE-HWST", manufacturer: Simona AG). This is joined together within 20 seconds with a further polyethylene test specimen ("PE-HWST", manufacturer: Simona AG) with simple overlapping over an area of 4 cm$^2$ and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing.

When non-modified VESTOPLAST 750 (not according to the invention, Evonik Degussa GmbH) is used, an adhesive shear strength of 0.69 N/mm$^2$ is measured. When modified polyolefin according to Example 9 (according to the invention) is used, an adhesive shear strength of 0.83 N/mm$^2$ is measured. When modified polyolefin according to Example 10 (according to the invention) is used, an adhesive shear strength of 1.20 N/mm$^2$ is measured.

e) Bonds on Poly(ethylene Terephthalate)

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a polyethylene terephthalate test specimen ("Axpet clear 099", manufacturer: Bayer Polymers). This is joined together within 20 seconds with a further polyethylene terephthalate test specimen ("Axpet clear 099", manufacturer: Bayer Polymers) with simple overlapping over an area of 4 cm$^2$ and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing. When non-modified VESTOPLAST 750 (not according to the invention, Evonik Degussa GmbH) is used, an adhesive shear strength of 0.4 N/mm$^2$ is measured.

When modified polyolefin according to Example 9 (according to the invention) is used, an adhesive shear strength of 1.23 N/mm$^2$ is measured. When modified polyolefin according to Example 10 (according to the invention) is used, an adhesive shear strength of 1.54 N/mm$^2$ is measured.

f) Bonds on Polycarbonate

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a polycarbonate test specimen ("Makrolon mono", manufacturer: Bayer Polymers). This is joined together within 20 seconds with a further polycarbonate test specimen ("Makrolon mono", manufacturer: Bayer Polymers) with simple overlapping over an area of 4 cm$^2$ and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing. When non-modified VESTOPLAST 750 (not according to the invention, Evonik Degussa GmbH) is used, an adhesive shear strength of 0.21 N/mm$^2$ is measured.

When modified polyolefin according to Example 9 (according to the invention) is used, an adhesive shear strength of 0.68 N/mm$^2$ is measured. When modified polyolefin according to Example 10 (according to the invention) is used, an adhesive shear strength of 1.15 N/mm$^2$ is measured.

g) Bonds on Polyamide 6

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a polyamide 6 test specimen ("Sustamid 6", manufacturer: Cadillac Plastic). This is joined together within 20 seconds with a further polyamide 6 test specimen ("Sustamid 6", manufacturer: Cadillac Plastic) with simple overlapping over an area of 4 cm$^2$ and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing. When non-modified VESTOPLAST 750 (not according to the invention, Evonik Degussa GmbH) is used, an adhesive shear strength of 0.62 N/mm$^2$ is measured.

When modified polyolefin according to Example 9 (according to the invention) is used, an adhesive shear strength of 1.29 N/mm$^2$ is measured. When modified polyolefin according to Example 10 (according to the invention) is used, an adhesive shear strength of 2.04 N/mm$^2$ is measured.

h) Bonds on High Impact Polystyrene

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a polystyrene test specimen ("METZO®Plast SB/HK", manufacturer: Metzeler Plastics GmbH). This is joined together within 20 seconds with a further polystyrene test specimen ("METZO®Plast SB/HK", manufacturer: Metzeler Plastics GmbH) with simple overlapping over an area of 4 cm² and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing. When non-modified VESTOPLAST 750 (not according to the invention, Evonik Degussa GmbH) is used, an adhesive shear strength of 0.31 N/mm² is measured.

When modified polyolefin according to Example 9 (according to the invention) is used, an adhesive shear strength of 0.82 N/mm² is measured. When modified polyolefin according to Example 10 (according to the invention) is used, an adhesive shear strength of 1.62 N/mm² is measured.

k) Bonds on ABS

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to an ABS test specimen ("METZO®PLAST ABS/G", manufacturer: Metzeler Plastics GmbH). This is joined together within 20 seconds with a further ABS test specimen ("METZO®PLAST ABS/G", manufacturer: Metzeler Plastics GmbH) with simple overlapping over an area of 4 cm² and the specimens are pressed against one another with a weight of 2 kg for 5 minutes. Protruding adhesive polymer is removed.

The bond sample is then stored for 14 days at 20° C. / 65% rel. atmospheric humidity in a climatically controlled cabinet and is then tested for its mechanical properties by means of tensile testing.

When non-modified VESTOPLAST 750 (not according to the invention, Evonik Degussa GmbH) is used, an adhesive shear strength of 0.23 N/mm² is measured. When modified polyolefin according to Example 9 (according to the invention) is used, an adhesive shear strength of 1.19 N/mm² is measured. When modified polyolefin according to Example 10 (according to the invention) is used, an adhesive shear strength of 2.0 N/mm² is measured.

l) Bonds on Steel

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST® 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a steel test specimen (high-grade steel 1.4301, dimensions: 100 mm×20 mm×1.5 mm). This is joined together within 20 seconds with a further steel test specimen (high-grade steel 1.4301, dimensions: 100 mm×20 mm×1.5 mm) with simple overlapping over an area of 4 cm² and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing.

When non-modified VESTOPLAST 750 (not according to the invention, Evonik Degussa GmbH) is used, an adhesive shear strength of 0.36 N/mm² is measured. When modified polyolefin according to Example 9 (according to the invention) is used, an adhesive shear strength of 0.41 N/mm² is measured. When modified polyolefin according to Example 10 (according to the invention) is used, an adhesive shear strength of 0.66 N/mm² is measured.

m) Bonds on Aluminum

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST° 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to an aluminum test specimen (99.5, dimensions: 100 mm×20 mm×1.5 mm). This is joined together within 20 seconds with a further aluminum test specimen (99.5, dimensions: 100 mm×20 mm×1.5 mm) with simple overlapping over an area of 4 cm² and the specimens are pressed against one another with a weight of 2 kg for 5 minutes. Protruding adhesive polymer is removed. The bond sample is then stored for 14 days at 20° C./65% rel. atmospheric humidity in a climatically controlled cabinet and is then tested for its mechanical properties by means of tensile testing. When non-modified VESTOPLAST 750 (not according to the invention, Evonik Degussa GmbH) is used, an adhesive shear strength of 0.26 N/mm² is measured. When modified polyolefin according to Example 9 (according to the invention) is used, an adhesive shear strength of 0.3 N/mm² is measured. When modified polyolefin according to Example 10 (according to the invention) is used, an adhesive shear strength of 0.36 N/mm² is measured.

n) Bonds on Copper

In each case 100 g of the polyolefins modified according to the invention are melted in a drying cabinet at 180° C. under an inert gas atmosphere (e.g. nitrogen, argon etc.) for one hour. The can with the hot melt is then stirred on a hot-plate with an IKA stirrer with a kneader. 5 g of DBTL masterbatch (comprising 98 wt. % of VESTOPLAST° 708, Evonik Degussa GmbH, and 2 wt. % of dibutyltin dilaurate) are added at 170° C. and the mixture is homogenized for 15 min. The polymer melt is then applied at a certain bonding temperature (with the aid of a heat sensor) to a copper test specimen (SF-CUF24, dimensions: 100 mm×20 mm×1.5 mm). This is joined together within 20 seconds with a further copper test specimen (SF-CUF24, dimensions: 100 mm×20 mm×1.5 mm) with simple overlapping over an area of 4 cm² and the specimens are pressed against one another with a weight of 2 kg for 5 minutes. Protruding adhesive polymer is removed. The bond sample is then stored for 14 days at 20°

C./65% rel. atmospheric humidity in a climatically controlled cabinet and is then tested for its mechanical properties by means of tensile testing. When non-modified VESTOPLAST 750 (not according to the invention, Evonik Degussa GmbH) is used, an adhesive shear strength of 0.27 N/mm² is measured.

When modified polyolefin according to Example 9 (according to the invention) is used, an adhesive shear strength of 0.30 N/mm² is measured. When modified polyolefin according to Example 10 (according to the invention) is used, an adhesive shear strength of 0.36 N/mm² is measured.

6. Example Formulations for Adhesives/Sealing Compositions with Polymers According to the Invention.

Procedure:

After melting of the modified polyolefin according to the invention at 190° C. in a drying cabinet under an inert gas atmosphere (e.g. nitrogen, argon etc.) for one hour, the formulation constituents are added and melted, if appropriate, and the components are then mixed homogeneously with a suitable mixing apparatus (e.g. on a hot-plate with an IKA stirrer with a kneader):

Non-reinforced Molding Composition 74.8 parts by weight of modified polyolefin according to the invention according to Ex. 15
5 parts by weight of DBTL masterbatch (98 wt. % of VESTOPLAST® 708, Evonik Degussa GmbH, 2 wt. % of dibutyltin dilaurate)
20 parts by weight of isotactic polypropylene (e.g. SABIC PP 520 P. Sabic)
0.2 part by weight of IRGANOX 1076 (octadecyl 3,5-di-(tert-butyl)-4-hydroxy-hydrocinnamate, Ciba)

Fiber-reinforced Molding Composition 59.8 parts by weight of modified polyolefin according to the invention according to Ex. 16
5 parts by weight of glass fibers (e.g. Owen Corning CS429YZ)
5 parts by weight of DBTL masterbatch (98 wt. % of VESTOPLAST® 708, Evonik Degussa GmbH, 2 wt. % of dibutyltin dilaurate)
30 parts by weight of isotactic polypropylene (e.g. SABIC PP 520 P, Sabic)
0.2 part by weight of IRGANOX 1076 (octadecyl 3,5-di-(tert-butyl)-4-hydroxy-hydrocinnamate, Ciba)

Before use, the glass fibers are desized pyrolytically at 550° C. in an oven for one hour.

Protective Composition (Motor Vehicle Underseal)

40 parts by weight of polyolefin modified according to the invention according to Ex. 9
39.3 parts by weight of partly crystalline polyolefin (e.g. VESTOPLAST 708, Evonik Degussa GmbH)
5 parts by weight of DBTL masterbatch (98 wt. % of VESTOPLAST® 708, Evonik Degussa GmbH, 2 wt. % of dibutyltin dilaurate)
10 parts by weight of low-viscosity polybutadiene oil (e.g. polyoil 110)
5 parts by weight of glass fibers (e.g. Owen Corning CS429YZ)
0.5 part by weight of carbon black (e.g. Printex 60)
0.2 part by weight of IRGANOX 1076 (octadecyl 3,5-di-(tert-butyl)-4-hydroxy-hydrocinnamate, Ciba)

Sealing Composition for Insulating Glass 46.3 parts by weight of polyolefin modified according to the invention according to Ex. 10
5 parts by weight of DBTL masterbatch (98 wt. % of VESTOPLAST® 708, Evonik Degussa GmbH, 2 wt. % of dibutyltin dilaurate)
20 parts by weight of butyl rubber
20 parts by weight zeolite, 3A
5 parts by weight of partly crystalline polyolefin (e.g. VESTOPLAST® 750, Evonik Degussa GmbH)
3 parts by weight of carbon black (e.g. Printex 60)
0.5 part by weight of organic silane (e.g. Dynasilan GLYMO, Evonik Degussa GmbH)
0.2 part by weight of IRGANOX 1076 (octadecyl 3,5-di-(tert-butyl)-4-hydroxy-hydrocinnamate. Ciba)

Hot Melt Adhesive for Motor Vehicle Interiors 72.8 parts by weight of polyolefin modified according to the invention according to Ex. 9
5 parts by weight of DBTL masterbatch (98 wt. % of VESTOPLAST® 708, Evonik Degussa GmbH, 2 wt. % of dibutyltin dilaurate)
15 parts by weight of hydrocarbon resin (e.g.: ESCOREZ 5300, ExxonMobil Chemical)
2 parts by weight of rosin ester (e.g. FORAL 105)
5 parts by weight of poly(ethylene-co-vinyl acetate) (e.g. ESCORENE MV02514)
0.2 part by weight of IRGANOX 1076 (octadecyl 3,5-di-(tert-butyl)-4-hydroxy-hydrocinnamate, Ciba)

Hot Melt Adhesive for Shoe Bonds 49.8 parts by weight of polyolefin modified according to the invention according to Ex. 14
5 parts by weight of DBTL masterbatch (98 wt. % of VESTOPLAST® 708, Evonik Degussa GmbH, 2 wt. % of dibutyltin dilaurate)
20 parts by weight of partly crystalline polyolefin (e.g. VESTOPLAST® 408, Evonik Degussa GmbH)
15 parts by weight of hydrocarbon resin (e.g.: ESCOREZ 5300, ExxonMobil Chemical)
5 parts by weight of poly(ethylene-co-vinyl acetate) (e.g. ESCORENE UL15028)
2 parts by weight of polyethylene wax (e.g. VESTOWAX® A227, Evonik Degussa GmbH)
3 parts by weight of calcite
0.2 part by weight of IRGANOX 1076 (octadecyl 3,5-di-(tert-butyl)-4-hydroxy-hydrocinnamate, Ciba)

Hot Melt Adhesive for Book Bonds 45.7 parts by weight of VESTOPLAST 408®, Evonik Degussa GmbH
30 parts by weight of polyolefin modified according to the invention according to Ex. 11
5 parts by weight of DBTL masterbatch (98 wt. % of VESTOPLAST® 708, Evonik Degussa GmbH, 2 wt. % of dibutyltin dilaurate)
10 parts by weight of saturated hydrocarbon resin (e.g. ARKON P90)
7 parts by weight of polyolefin wax (e.g. LICOWAX PP230)
2 parts by weight of MAA-grafted polypropylene wax (e.g. LICOMONT TPAR504)
0.3 part by weight of IRGANOX 1076 (octadecyl 3,5-di-(tert-butyl)-4-hydroxy-hydrocinnamate, Ciba)

Hot Melt Adhesive for Packagings (Material: Polypropylene)

44.7 parts by weight of partly crystalline polyolefin (e.g. VESTOPLAST® 828, Evonik Degussa GmbH)
40 parts by weight of polyolefin modified according to the invention according to Ex. 12
5 parts by weight of DBTL masterbatch (98 wt. % of VESTOPLAST® 708, Evonik Degussa GmbH, 2 wt. % of dibutyltin dilaurate)
10 parts by weight of hydrocarbon resin (e.g.: ESCOREZ 1102, ExxonMonil Chemical)
0.3 part by weight of IRGANOX 1076 (octadecyl 3,5-di-(tert-butyl)-4-hydroxy-hydrocinnamate, Ciba)

Universal Hot Melt Adhesive with a Wide Profile of Uses 84.7 parts by weight of polyolefin modified according to the invention according to Ex. 9

5 parts by weight of DBTL masterbatch (98 wt. % of VESTO-PLAST® 708, Evonik Degussa GmbH, 2 wt. % of dibutyltin dilaurate)

2 parts by weight of MAA-grafted polypropylene copolymer (e.g. EXXELOR P01015)

3 parts by weight of polyolefin wax (e.g. VESTOWAX A616, Evonik Degussa GmbH,)

5 parts by weight of hydrocarbon resin (e.g.: ESCOREZ 1102, ExxonMobil Chemical)

0.3 part by weight of IRGANOX 1076 (octadecyl 3,5-di-(tert-butyl)-4-hydroxy-hydrocinnamate, Ciba)

Hot Melt Adhesive for Edging Strips 24.7 parts by weight of polyolefin modified according to the invention according to Ex. 16

5 parts by weight of DBTL masterbatch (98 wt. % of VESTO-PLAST® 708, Evonik Degussa GmbH, 2 wt. % of dibutyltin dilaurate)

15 parts by weight of partly crystalline polyolefin VESTO-PLAST 891®, Evonik Degussa GmbH 10 parts by weight of partly crystalline polyolefin VESTO-PLAST 792®, Evonik Degussa GmbH 3 parts by weight of isotactic polypropylene (e.g. SABIC PP 579S, Sabic)

2 parts by weight of MAA-grafted polypropylene wax (e.g. LICOMONT TPAR504)

12 parts by weight of hydrogenated aliphatic hydrocarbon resin (e.g. EASTOTAC H-130)

4 parts by weight of aromatic hydrocarbon resin (e.g. NOVARES TN150)

12 parts by weight of poly(ethylene-co-vinyl acetate) copolymer (e.g. ELVAX210)

12 parts by weight of calcite 0.3 part by weight of IRGANOX 1076 (octadecyl 3,5-di-(tert-butyl)-4-hydroxy-hydrocinnamate, Ciba)

Primer for Polypropylene/Polyethylene (Recipe 1)

80 parts by weight of xylene 20 parts by weight of polyolefin modified according to the invention according to Ex. 9

The invention claimed is:

1. A modified polyolefin, comprising propylene, the modified polyolefin having:
   a content of propylene, determined by $^{13}$C-NMR spectroscopy, of between 50 and 75 wt. % and a content of ethylene of from 5 to 25 wt. %;
   a content of poly(ethylene) triads, determined by $^{13}$C-NMR spectroscopy, of a maximum of 2.5 wt. %, based on the total ethylene content detected;
   a melt enthalpy, determined by differential scanning calorimetry, of at least 9 and a maximum of 20 J/g;
   a solubility in xylene at room temperature of at least 96 wt. %; and
   a solubility in tetrahydrofuran at room temperature of at least 67 wt. %,
   wherein at least one silane is grafted onto the modified polyolefin.

2. The modified polyolefin of claim 1, further comprising 1-butene.

3. The polyolefin of claim 1, wherein a glass transition temperature of a non-modified, non-grafted, form of the modified polyolefin, determined by DSC, is a maximum of −20° C.

4. The polyolefin of claim 1, selected from the group consisting of poly(ethylene-co-propylene) and poly(ethylene-co-propylene-co-1-butene).

5. The polyolefin of claim 1, wherein a melt viscosity of the modified polyolefin at 190° C. is 1,000 to 75,000 mPa*s.

6. The polyolefin of claim 1, wherein a softening point of the modified polyolefin, measured by a ring and ball method, is 80 to 120° C.

7. The polyolefin of claim 1, wherein a needle penetration of the modified polyolefin is between 10 and 40*0.1 mm.

8. The polyolefin of claim 1, wherein a tensile strength of the modified polyolefin in a non-crosslinked state is at least 0.5 MPa.

9. The polyolefin of claim 1, wherein an elongation at break of the modified polyolefin in a non-crosslinked state, determined in a tensile test, is at least 75%.

10. The polyolefin of claim 1, wherein the at least one silane is selected from the group consisting of vinyltrimethoxysilane, vinyltriethoxysilane, vinyl-tris(2-methoxyethoxy-)silane, 3-methacryloxypropyltrimethoxysilane, 3-methacryloxypropyltriethoxysilane, vinyldimethylethoxysilane, and vinylmethyldibutoxysilane.

11. The polyolefin of claim 1, having a silicon content, determined by x-ray fluorescence spectroscopy, of at least 0.3 wt. %.

12. The modified polyolefin of claim 1, having a content of propylene of from 62 to 72 wt. %, a content of ethylene of from 5 to 13 wt. %, a content of poly(ethylene) triads of 2.0 wt. % or less, a melt enthalpy of 10.4-14.3 J/g, and a solubility in THF of at least 78%.

13. The modified polyolefin of claim 1, comprising from 3.5 to 13.75 wt. % of the silane grafted onto the modified polyolefin.

14. The modified polyolefin of claim 1, having an amount of silicon of from 0.35 to 0.5 wt. %.

15. A molding composition, protective composition, adhesive, sealing composition, marking composition, coating composition, sealing sheet or roofing felt, primer, primer formulation, adhesion promoter formulation, dispersion, suspension, or emulsion, comprising the modified polyolefin of claim 1.

16. The adhesive as claimed in claim 15, in the form of a hot melt adhesive formulation.

17. The adhesive of claim 15, further comprising at least one selected from the group consisting of a crosslinking accelerator, an inorganic filler, an organic filler, an inorganic pigment, an organic pigment, a synthetic resin, a natural resin, an inorganic synthetic polymer, an inorganic natural polymer, an organic synthetic polymer, an organic natural polymer, an inorganic synthetic fiber, an inorganic natural fiber, an organic synthetic fiber, an organic natural fiber, an inorganic stabilizer, an organic stabilizer, an inorganic flameproofing agent, an organic flameproofing agent, a resin, an amorphous poly(a-olefin), a polymer with at least one polar group, a polymer comprising ethylene, a polymer comprising butadiene, a polymer comprising styrene, a polymer comprising isoprene, an elastomeric polymer comprising ethylene, an elastomeric polymer comprising propylene, an elastomeric polymer comprising acrylonitrile, an elastomeric polymer comprising a diene, an elastomeric polymer comprising a cyclic diene, an elastomeric polymer comprising styrene, a wax, a synthetic oil, a natural oil, and a UV-active substance.

18. The sealing sheet of claim 15, further comprising at least one selected from the group consisting of a different polymer, a filler, and bitumen.

19. A bond comprising the modified polyolefin of claim 1.

20. The bond of claim 19, in the form of a packaging bond, bond on a hygiene article, wood bond, bond on a glass surface, label bond, laminating bond, carpet bond, artificial lawn bond, shoe bond, pressure-sensitive bond, book bond, or textile bond.

21. The bond of claim 20, which is a carpet bond and which binds in tufts and filaments and has, an application weight of from 20 to 1,500 g/m².

22. The bond of claim 20, which is an artificial lawn bond and wherein a filament bound in by the bond is at least one selected from the group consisting of a polypropylene filament, a polyethylene filament, a polyamide filament, a polyester filament.

23. The dispersion, suspension and/or emulsion of claim 15, having a content of the modified polyolefin is more than 10 wt. %, based on a total formulation.

24. A process for preparing the modified polyolefin of claim 1, the processing comprising:
bringing a polyolefin having:
a content of propylene, determined by $^{13}$C-NMR spectroscopy, of at least 50 wt. % a maximum of 75 wt. % and a content of ethylene of from 5 to 25 wt. %;
a content of poly(ethylene) triads, determined by $^{13}$C-NMR spectroscopy, of a maximum of 2.5 wt. %, based on total ethylene content detected;
a melt enthalpy, determined by differential scanning calorimetry, of 9 to 20 J/g;
a solubility in xylene at room temperature of at least 96 wt. %; and
a solubility in tetrahydrofuran at room temperature of at least 60 wt. %,
into contact with at least one free radical initiator and at least one silane, then
grafting the at least one silane onto the polyolefin to form the modified polyolefin.

25. The process of claim 24, wherein the at least one silane is selected from the group consisting of vinyltrimethoxysilane, vinyltriethoxysilane, vinyl-tris(2-methoxy-ethoxy-)silane, 3-methacryloxypropyltrimethoxysilane, 3-methacryloxypropyltriethoxysilane, vinyldimethylethoxysilane, and vinylmethyldibutoxysilane.

26. The process of claim 12, wherein the grafting is carried out in solution or in a melt.

27. The process of claim 12, wherein the grafting is carried out at a temperature of from 30 to 250° C.

28. The process of claim 24, wherein a temperature of a reaction mass comprising the at least one non-modified polyolefin at a time of metering in of the at least one free radical initiator is above the self accelerating decomposition temperature, SADT, of the at least one free radical initiator metered in.

* * * * *